United States Patent
Tanamachi et al.

[11] Patent Number: 5,677,610
[45] Date of Patent: Oct. 14, 1997

[54] CONTROL APPARATUS FOR ELECTRIC VEHICLES

[75] Inventors: Tokunosuke Tanamachi; Kiyoshi Nakamura, both of Hitachinaka; Masanori Kobayashi, Nishiibaraki-gun, all of Japan

[73] Assignee: Hitachi, Ltd., Tokyo, Japan

[21] Appl. No.: 519,397

[22] Filed: Aug. 25, 1995

[30] Foreign Application Priority Data

Sep. 1, 1994 [JP] Japan .................................. 6-208357

[51] Int. Cl.$^6$ .................................................. H02P 5/34
[52] U.S. Cl. .................................................. 318/801
[58] Field of Search ........................... 318/798–815, 318/254, 138, 439; 180/197; 363/40, 41

[56] References Cited

U.S. PATENT DOCUMENTS

| | | | |
|---|---|---|---|
| 4,825,131 | 4/1989 | Nozaki et al. | 318/254 X |
| 4,870,338 | 9/1989 | Abbondanti | 318/809 X |
| 5,248,926 | 9/1993 | Kotake et al. | 318/807 |
| 5,264,773 | 11/1993 | Koyama et al. | 318/798 |
| 5,481,173 | 1/1996 | Yamamoto | 318/801 |
| 5,504,667 | 4/1996 | Tanaka et al. | 363/40 X |
| 5,532,571 | 7/1996 | Masaki et al. | 318/809 |
| 5,542,501 | 8/1996 | Ikejima et al. | 318/799 X |

FOREIGN PATENT DOCUMENTS

| | | |
|---|---|---|
| 85394 | 8/1983 | European Pat. Off. . |
| 594130 | 4/1994 | European Pat. Off. . |
| 4224581 | 12/1993 | Germany . |

OTHER PUBLICATIONS

"Slip/Skid Control of Inverter–Drive Vehicles", Proceedings of Japan Electric and Electronics Engineers Association, Industrial Applications, National Convention, 1990.
"Novel high adhesion control method for VVVF inverter control", Denkisha–no–Kagaku, Feb., 1992.

*Primary Examiner*—Karen Masih
*Attorney, Agent, or Firm*—Antonelli, Terry, Stout & Kraus, LLP.

[57] ABSTRACT

A control apparatus for controlling an electric vehicle, electric car, rolling stock and electric locomotives, which ensures that an inverter output frequency command for its inverter will not depend on the rotor frequency of the induction motor, but controls the inverter output current using a constant current control system, thus preventing an overcurrent, and is capable of accelerating or decelerating the vehicle at a torque precisely corresponding to a current command. The inverter output frequency command is incremented or decremented in accordance with a frequency-to-time rate-of-change command which has been updated by the current control system. Since the inverter output frequency command is adapted basically not to depend on the rotor frequency of the induction motor, and since the output current of the inverter is controlled by the constant current control system, there are such advantages according to the invention that an overcurrent is not likely to occur, and the vehicle can be accelerated or decelerated at a torque precisely corresponding to the current command.

32 Claims, 18 Drawing Sheets

*FIG. 2(A)*
INVERTER OUTPUT CURRENT Im
(THE SAME AS SLIP FREQ. AND TORQUE)
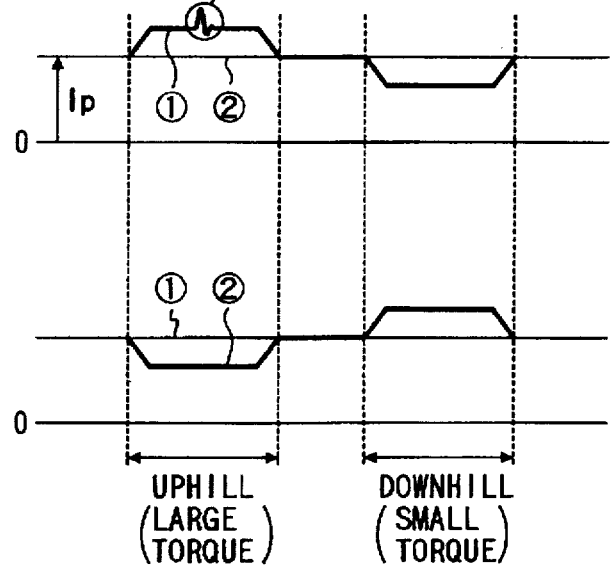
*FIG. 2(B)*
FREQ.-TO-TIME RATE-OF-CHANGE COMMAND α
① CONVENTIONAL FREQ. RATE-OF-CHANGE CONTROL
② WITH THE EMBODIMENT OF FIG. 1
*FIG. 3*
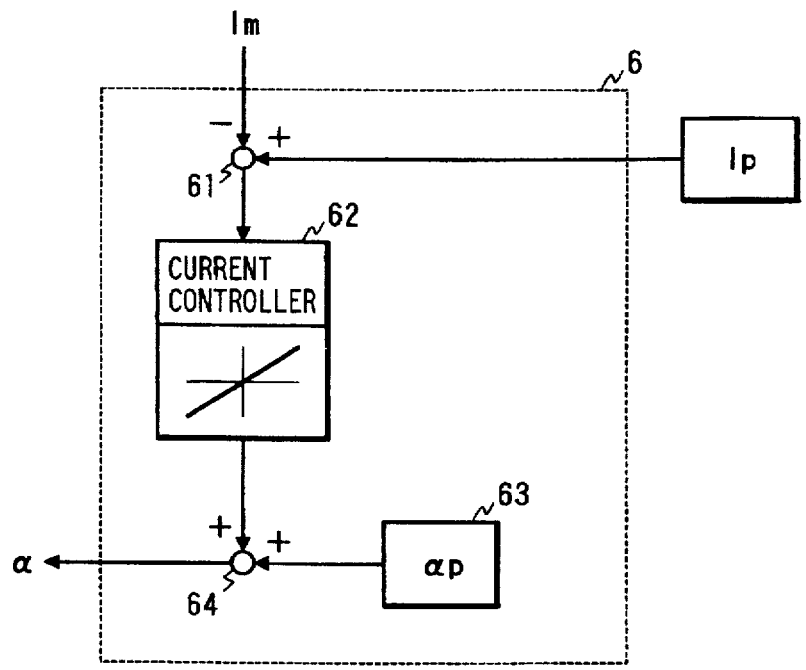

SLIP SPEED

INVERTER OUTPUT FREQ. COMMAND Fin

ROTOR FREQ. Fr

INVERTER OUTPUT CURRENT Im
(THE SAME AS SLIP FREQ. AND TORQUE)

FREQ.-TO-TIME RATE-OF-CHANGE COMMAND α

① CONVENTIONAL CONSTANT CURRENT CONTROL
② CONVENTIONAL FREQ. RATE-OF-CHANGE CONTROL
③ CONTROL WITH THE EMBODIMENT OF FIG. 4

INVERTER OUTPUT FREQ. COMMAND Fin

ROTOR FREQ. Fr

VEHICLE SPEED Ft

ROTOR FREQ. DIFFERENTIAL $\Delta F$

INVERTER OUTPUT CURRENT Im (THE SAME AS SLIP FREQ. AND TORQUE)

FREQ.-TO-TIME RATE-OF-CHANGE COMMAND $\alpha$

OUTPUT COEFF. Kc FROM COEFF. MULTI. 112

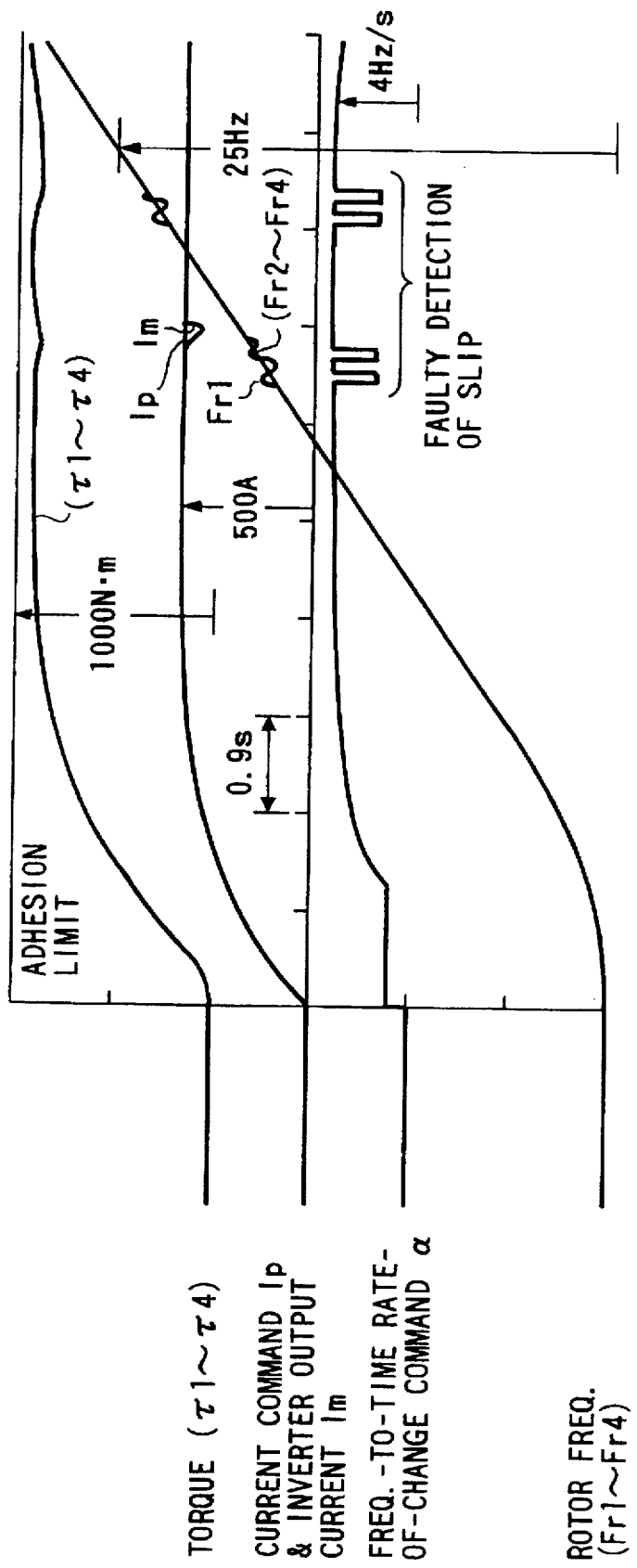

CONTROL APPARATUS FOR ELECTRIC VEHICLES

BACKGROUND OF THE INVENTION

The present invention relates to control apparatus for controlling electrical vehicles, including electric cars and rolling stocks, and in particular to control apparatus for controlling inverter-fed induction motors therefor.

In an inverter controlled-vehicle, it is well known and the common practice for an output frequently command for the inverter to be obtained by adding or subtracting a slip frequency command to or from a rotor frequency of the associated induction motor, and for an output voltage of the inverter to be controlled in proportion to an inverter output frequency command, so that a ratio of voltage V and frequency F, i.e., V/F, may be maintained constant, and further for a constant current control of the motor current to be carried out by the slip frequency control. It is also known that such a constant current control system has a disadvantage in that, when a slip/skid occurs between the wheel and the rail, the rotor frequency of the motor is caused to increase/decrease to suppress a decreasing of the slip frequency, i.e., motor current, thereby, failing to decrease torque, thus, adversely promoting the slip/skid, and in consequence leading to a violent slip/skid phenomenon.

One method of coping with this slip/skid phenomenon and recovery of adhesion between the wheel and the rail upon detection of such slip/skid, by controlling the slip frequency or current command in accordance with a predetermined pattern, is disclosed in a publication entitled "Slip/Skid Control of Inverter-Drive Vehicles", Proceedings of Japan Electric and Electronics Engineers Association, Industrial Applications, National Convention, 1990 (hereinafter, referred to as document (1)).

In contrast to the foregoing constant current control method, another approach referred to as a frequency rate-of-change control is proposed in a publication entitled "Novel high adhesion control method for VVVF inverter control", Denkisha-no-Kagaku, February, 1992 (hereinafter referred to as document (2)). According to this control method, an inverter output frequency command is given through integral operation of data from a given frequency rate-of-change (acceleration) pattern. As a result, a self-adhesion is expected to occur even under presence of a slip. In addition, it is disclosed that, by modifying the frequency rate-of-change upon detection of a slip, recovery of adhesion can be facilitated.

SUMMARY OF THE INVENTION

According to the aforementioned inverter control method in which the inverter output frequency command is dependent on the rotor frequency (since the inverter frequency command is obtained both from the rotor frequency and the slip frequency), and in which the constant current control is carried out even under presence of a slip/skid, the advantage of a so-called self-adhesion recovery property intrinsic to the induction motor is not fully utilized, since in the event of a slip/skid, the slip/skid is allowed to grow, and tends to result in a catastrophic slip/skid phenomenon. Further, for an appropriate control of the inverter output frequency, it is essential always to obtain rotational frequencies of the induction motor. Thereby, there arises such a problem that, when its rotor frequency oscillates due to running over a rail-joint or the like, an adverse effect may be introduced in the current control system.

In the re-adhesion control method of the cited document (1) in which the slip frequency or the current command is controlled in accordance with a predetermined pattern of curve upon detection of a slip/skid as disclosed in the document (1), the torque of the induction motor is determined by the slip frequency or by the control pattern of the current command. Further, since a detection level for detecting a slip/skid is set rather at a larger value in order to prevent a false detection of a slip/skid, it has been difficult to improve the average torque of the induction motor under readhesion control to approach a value in the vicinity of a readhesion limit between the wheel and the rail.

On the other hand, according to the inverter control method disclosed in the cited document (2) which does not use the rotor frequency, since there is not provided such a constant current control system as provided in the publication (1), there arises a problem that an overcurrent is likely to occur due to a surge in the supply line voltage or the like.

There is a description in this respect in the document (2) that in order to deal with a rail gradient and changes in car loading weights, the frequency rate-of-change is selectably controlled by the upper and lower current limiter. This, however, is not practical, since an overcurrent tends to occur, as will be described later.

A first object of the invention is to provide a control apparatus for controlling an electric vehicle, an electric car, rolling stocks or locomotives, which does not use a rotor frequency of an induction motor in principle when producing an output frequency command for an associated inverter, and in addition, which is capable of accelerating (during powering) or decelerating (during regenerating) the electric vehicle at a torque precisely corresponding to an actual current command.

A second object of the invention is to provide a control apparatus for controlling the electric vehicle whereby, even under presence of a slip (during powering) or a skid (during regenerating), a self-readhesion property of the induction motor can be realized, in addition to the first object, that can suppress the occurrence of a catastrophic slip or skid, and can recover the self-readhesion depending on a rail condition in which the adhesion between the rail and wheels is decreased temporarily due to oil smears on the rail, for example.

Further, a third object of the invention is to provide, in addition to the second object, a control apparatus for controlling the electric vehicle whereby, under the conditions where a slip or skid is likely to take place, the self-readhesion property intrinsic to the induction motor may be enhanced, and the vehicle may be accelerated and decelerated at a torque corresponding to a rail condition at that instant.

The first object of the invention described above will be realized by a control apparatus comprising: an induction motor for driving an electric vehicle; an inverter for driving this induction motor; means for generating a current command for the inverter to output an output current in response thereto; means for detecting the output current of the inverter; means for generating a frequency-to-time rate-of-change command for an output frequency of the inverter on the basis of a difference between the current command and a detected value of the output current; and means for generating an output frequency command for the output frequency of the inverter on the basis of this frequency-to-time rate-of-change command.

Further, the second object of the invention will be realized by a control apparatus comprising: the induction motor for driving an electric vehicle; the inverter for driving this induction motor; means for generating a current command for the inverter to output an output current in response thereto; means for detecting the output current of the inverter; means for generating a frequency-to-time rate-of-change command for an output frequency of the inverter on the basis of a difference between the current command and a detected value of the output current, the frequency-to-time rate-of-change command being limited by limiting means so as not to exceed a predetermined value; and means for generating an output frequency command for the output frequency of the inverter in dependency on an output from the limiting means.

Still further, the third object of the invention will be realized by a control apparatus comprising: the induction motor for driving the electric vehicle; the inverter for driving this induction motor; means for generating a current command for the inverter to output an output current in response thereto; means for detecting the output current of the inverter; means for generating a frequency-to-time rate-of-change command for the output frequency of the inverter, the value of which is limited not to exceed a predetermined value on the basis of a difference between the current command and a detected value of the output current; means for detecting a slip or skid of a driving wheel coupled to the induction motor; readhesion control means which reduces an output from the limiting means upon reception of an output from the detection means; and means for generating an output frequency command for the output frequency of the inverter on the basis of an output from this readhesion control means.

According to a first arrangement of the invention, a frequency-to-time rate-of-change command for the output frequency of the inverter is controlled such that the inverter output current coincides with a current command, and that in dependency on this frequency-to-time rate-of-change command, an inverter output frequency command is adapted to increment at the time of power motoring and decrement at the time of regenerating. Therefore, the rotor frequency is no longer needed in principle in producing the inverter output frequency command. In addition, since the frequency-to-time rate-of-change command is adapted substantially to correspond to the current command, the electric vehicle can be controlled to accelerate at the time of power motoring or decelerate at the time of regeneration at a torque substantially corresponding to the current command.

According to a second arrangement of the invention, the operation is basically the same as the foregoing first arrangement when no slip or skid is present during power motoring or regeneration. Then, due to occurrence of a slip/skid, if a motor current decreases, and the inverter output current becomes smaller than its current command, the frequency-to-time rate-of-change command is limited to a predetermined value, namely, to a reference value which is greater than a frequency-to-time rate-of-change of an associated output frequency of the inverter corresponding to an acceleration or deceleration of the electric vehicle. An increment or decrement in the inverter output frequency command in response to the predetermined value of the frequency-to-time rate-of-change command is adapted to be smaller than an increment or decrement in the rotor frequency of the induction motor resulting from a slip or skid, that is, since the torque will decrease due to a decrease in the slip frequency (motor current), it is likely to prevent a catastrophic slip or skid, and moreover, a self-readhesion can be expected to take place advantageously depending on the rail conditions when the adhesion between the rail and the wheels is temporarily lowered due to smeared oil, for example.

Further, according to a third arrangement of the invention, the operation is basically identical with that of the foregoing arrangement when there is not present any slip or skid. Then, under such a condition where a slip or skid is occurring, the readhesion control system is put into operation to cause an associated frequency-to-time rate-of-change command to become smaller than an associated inverter output frequency-to-time rate-of-change corresponding to an acceleration or deceleration of the electric vehicle in dependency on a detected slip or skid signal so as to enhance its self-readhesion performance, or to cause the frequency-to-time rate-of-change command to be adjusted according to the quantity of acceleration or deceleration. As a result, in the former case, the self-readhesion becomes easier to attain, thereby in such an instance where a cycle of slip/skid and readhesion is recurring, an average frequency-to-time rate-of-change command is adapted to correspond to a value in the vicinity of an adhesion limit definable between the wheel and the rail, whereby the electric vehicle will be accelerated or decelerated on average at a torque corresponding to a particular rail condition. In the latter case, the frequency-to-time rate-of-change command is made to correspond to a value in the vicinity of the readhesion limit defined between the wheel and the rail, whereby the electric vehicle will be accelerated or decelerated at a torque corresponding to a particular rail condition.

BRIEF DESCRIPTION OF THE DRAWINGS

Other features and advantages of the invention will be apparent from the following description taken in conjunction with the accompanying drawings wherein.

FIGS. 2(A) and 2(B) are diagrams showing influences of load and the like acting on the first embodiment of FIG. 1;

FIG. 3 is a circuit diagram which shows another arrangement of frequency-to-time rate-of-change generation means 6 depicted in FIG. 1;

FIG. 19 is a diagram which shows results of simulation on faulty slip detection using the control circuit of FIG. 15.

DESCRIPTION OF THE PREFERRED EMBODIMENT

Figure 1:
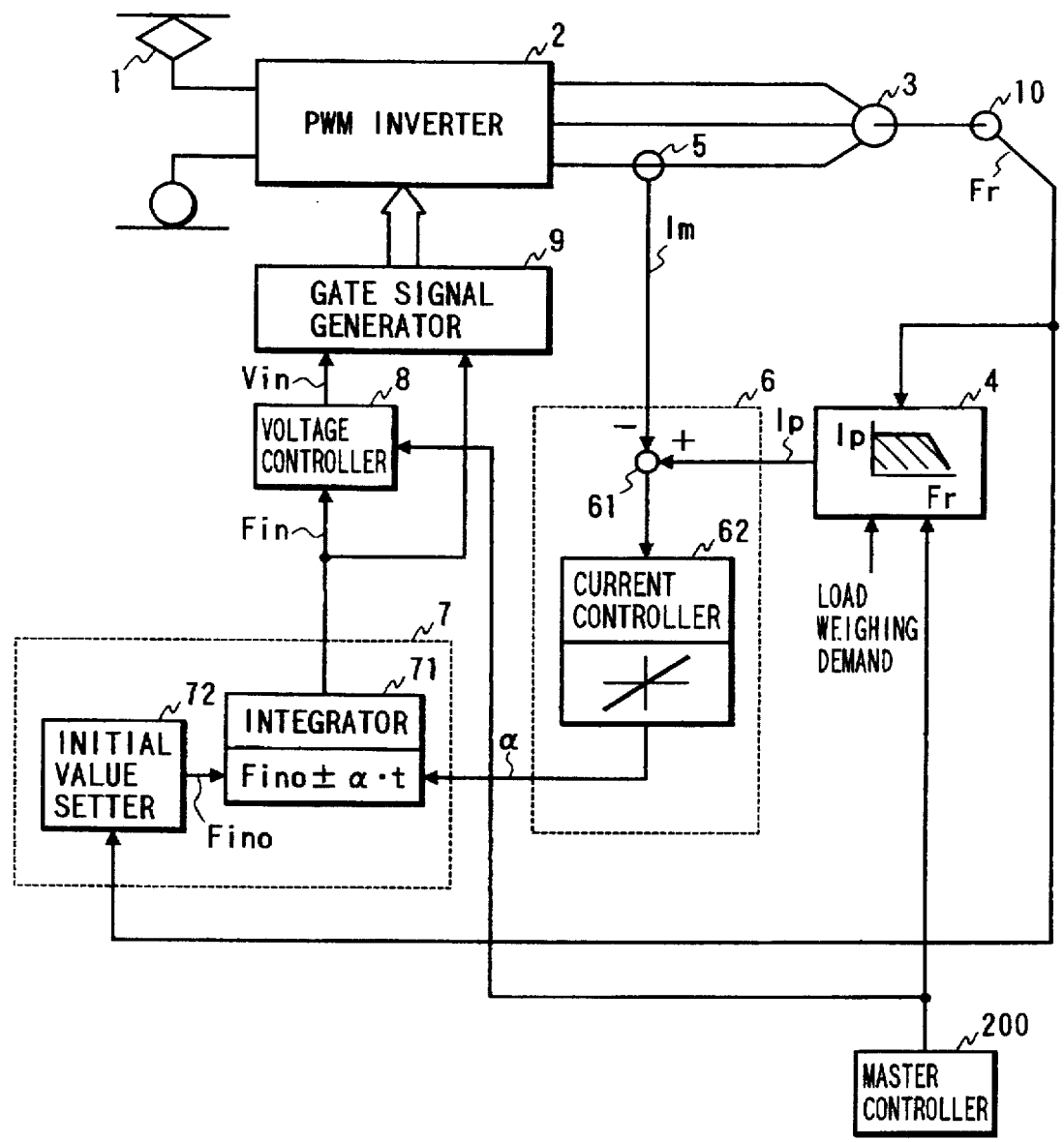
FIG. 1 is a schematic circuit diagram of a first embodiment of the invention.

A FIRST EMBODIMENT:

With reference to FIG. 1, a first embodiment according to the invention will be described, in which numeral I denotes a pantograph for receiving a d.c. current from a feeder line, 2 denotes a pulse width modulation (PWM) inverter which converts the d.c. current into a three-phase a.c. current, 3 denotes an inverter-fed induction motor for driving an electric vehicle, car or rolling stock, 4 denotes means for generating a current command Ip for the inverter to output an output current in response thereto, 5 denotes means for detecting an output current Im of the inverter 2, and 200 denotes a master controller.

The master controller is provided for producing a notch command to be entered by the driver via an operator handle to current command generation means 4 and also to voltage control means 8. The current command generation means 4, in response to this notch command, as well as a motor speed Fr and a load signal entered from a load weighing demand device (not shown), outputs a current command Ip in response to the motor speed Fr and the notch command. By way of example, this notch command in the case of an electric rolling stock will specify a maximum speed, and in the case of an electric locomotive will specify a current value itself, i.e., a torque command. Since this first embodiment of the invention, is concerned with an electric vehicle or car, a current command Ip curve relative to the motor speed Fr is shown. Further, the load weighing device detects a weight of passengers aboard an electric car or train, and in response to an output therefrom, the current command is adjusted such that, in the case when the train is fully loaded, the current command is incremented, and in the case when the train is not fully loaded, the current command is decremented.

Numeral 6 denotes means for generating a command signal α, which is a frequency-to-time rate-of-change (a change in the output frequency relative to time (Hz/s)) command for an output frequency of the inverter 2, which command α is obtained through steps of first subtracting a detected value Im of the inverter output current from an associated current command Ip in a subtractor 61, and then referring to a current control device 62, in dependency on the result of the subtraction. The frequency-to-time rate-Of-change for the output frequency of the inverter 2 will be referred to as a frequency-to-time rate-of-change hereinafter. In general, for the electric vehicle or train, a normal acceleration for traveling on flat rails is predetermined, and an associated torque (traction force) capable of traveling at this predetermined acceleration is set accordingly. On the basis of this torque set as indicated above, a nominal voltage, current and the like which specify the particulars of an induction motor are determined, and then, in turn, according to this motor current thus determined, a current capacity of the inverter is determined. This inverter 2 comprises a plurality of self-extinction semiconductor switching elements (not shown).

Since these switching elements are arranged to supply a large current to the induction motor, should an overcurrent occur, there arises a danger that the overcurrent will lead to a destruction of these switching elements. Therefore, the inverter must be carefully controlled according to its rated current capacity. In the above-mentioned document (2), its current provided in an open loop is not controlled in the manner as above, thereby entailing a danger of destruction of the switching elements; thereby, the method of document (2) is not practical in designing an appropriate control system for an electric vehicle.

Numeral 7 denotes means for generating an output frequency command Fin for the inverter 2 in which a plus sign corresponds to powering or motoring, and a minus sign to regenerating. In this generating means 7, at first, at the time of starting of the inverter 2, an initial value Fino for inverter output frequency command Fin is set by an initial value setter 72 on the basis of a detected value of rotor frequency Fr of the induction motor 3 detected by a detector 10. This setter is provided for facilitating re-powering or regeneration braking of the electric vehicle at any moment so that a smooth re-powering or regeneration braking may be applied from any vehicle speed (rotor frequency of the motor 3). Without such an arrangement, the vehicle may be subjected to an unexpected acceleration or deceleration. Further, since the rotor frequency Fr obtained from detector 10 is not always used for continuous control, the output from the detector 10 will not affect the overall current control system even when it is subjected to oscillation due to a disturbance. Next, an integrator 71 integrates the frequency-to-time rate-of-change command α, and adds (when powering) or subtracts (when regenerating) the result of integrating to or from the initial value Fino thereby to output inverter output frequency command Fin.

Numeral 8 denotes voltage control means which carries out both a variable voltage variable frequency control (VVVF area control) which adjusts an output voltage from the inverter 2 to become approximately proportional to the output frequency command Fin for the inverter, and a constant voltage variable frequency control (CVVF area control) which fixes an output voltage from the inverter substantially at a predetermined value. This voltage control means also carries out a so-called notch stop action to limit the voltage command obtained as indicated above in response to a notch command from the master controller 200. This notch stop is also effectuated in the current command generating means 4 which will produce a current command to yield a maximum speed corresponding to the notch in order to prompt its effect to appear.

Numeral 9 denotes gate signal generation means, which in response to inverter output frequency command Fin and voltage command Vin from voltage control means 8 supplies a gate signal to switching elements (not shown) constituting the inverter 2 so that the inverter 2 may perform a predetermined operation in response thereto.

According to the aforementioned circuit configuration of the first embodiment of the invention, the frequency-to-time rate-of-change command α is controlled such that inverter output current Im becomes equal to the current command Ip. Then, on the basis of this frequency-to-time rate-of-change command α thus controlled, the inverter output frequency command Fin is adapted to increment (when powering) or decrement (when regenerating). As a result, the frequency-to-time rate-of-change command α is adapted substantially to correspond to the current command Ip, thereby, the vehicle is ensured of being accelerated (during powering) or decelerated (during regenerating) at a torque corresponding to the current command Ip.

In the first embodiment of the invention depicted in FIG. 1, when a constant speed operation is desired, if there is provided means for causing the frequency-to-time rate-of-change command $\alpha$ to become equal to 0 in response to a constant operation command, a the speed at the instant when the constant operation command is issued is basically maintained.

Further, the inverter output frequency command generation means 7 needs additional means for suppressing the slip frequency of the induction motor 3 from exceeding a predetermined value Fsm, that is, means for ensuring that the inverter output frequency command Fin will not exceed a frequency obtained by adding Fsm to the rotor frequency during powering, or Fin will not become smaller than a frequency obtained by subtracting Fsm from the rotor frequency during regenerating.

With reference to FIGS. 2(A) and 2(B), respective influences on the load and the like by frequency rate-of-change control methods as disclosed in document (2) and by the first embodiment of the present invention illustrated in FIG. 1 will be compared in the following discussion.

In the drawing, according to the frequency rate-of-change control method of the prior art which is depicted by ①, when the load changes due to a hill climbing or a down hill riding, since no constant current control system is provided, unless its current limiter is caused to operate, an associated inverter output current Im is caused to change corresponding to changes in the load as indicated in FIG. 2(A). Thereby, there occurs a problem that, when the feeder line voltage is subjected to a surging during a time when a large load is being applied and its current limiter is in operation, as indicated by a circle on its curve, an overcurrent is likely to result.

In contrast to the prior art method, according to the method of the invention using the first embodiment of FIG. 1, it is shown by ② such that the frequency-to-time rate-of-change command $\alpha$ is controlled as indicated in FIG. 2(B) by the frequency-to-time rate-of-change command generation means 6 so that the inverter output current Im becomes identical with the current command Ip even when the load changes, and thereby, Im of ② becomes constant as indicated in FIG. 2(A). This effect is due to a proper management of current flow by the current control system for ensuring that a current corresponding to the current capacity of the inverter (so that the actual inverter current equals the current command) will flow therethrough. Thereby, the problem of overcurrent associated with the prior art is eliminated.

As described above, since the inverter output frequency command is adapted not to depend on the rotor frequency of the induction motor in principle, there are such advantages that the current control system of the invention is not affected by an oscillation in the rotor frequency which may arise when the vehicle transits on a rail joint or point, and further that since the inverter output current is controlled by the current control system, an overcurrent is not likely to result in. Therefore, the vehicle can be accelerated or decelerated at a torque precisely corresponding to the current command.

Further, in comparison with the prior art slip frequency adjustable method described in document (1) which, in order to control the inverter output current, adjusts the slip frequency in response to an output from the current control system, since the present invention adopts such an arrangement that the frequency-to-time rate-of-change command is adjusted in order to control the inverter output current (namely, the frequency-to-time rate-of-change is adjusted by an output from the current control system), so that the slip frequency which is directly related to the torque is not directly controlled as is done in the aforementioned prior art, there is an advantage that torque fluctuation in the electrical vehicle due to disturbance in the current control system is minimized.

With reference to FIG. 3, the frequency-to-time rate-of-change command generation means 6 may further include means 63 for generating a predetermined frequency-to-time rate-of-change command $\alpha p$, and then, an output from current controller 62 corresponding to a difference between a current command Ip and a detected value Im of the associated inverter output current can be added to $\alpha p$ in adder 64 to produce a frequency-to-time rate-of-change command $\alpha$. This arrangement should be construed to yield the same operation and effect as those in the former arrangement within the scope of the invention. In this instance, the current controller 62 is adapted only to adjust a current differential, thereby reducing the burden imposed on the current controller 62.

With respect to the first embodiment of FIG. 1 of the invention, in absence of a slip or skid, a preferred control is ensured. However, when a slip (at powering) or a skid (at regeneration) occurs, the rotor frequency of the induction motor 3 either increases (at powering) or decreases (at regeneration) so as to decrease the slip frequency, i.e., inverter output current (or motor current) Im, the value of which Im, however, does not change basically since it is suppressed by the constant current control system. Thereby, there arises a problem is that, since the torque does not decrease, the rotor frequency is allowed to increase or decrease even more, thereby causing the slip or skid to advance into a violent slip or skid in consequence. A method to solve such problem will be described in the following.

Figure 4:
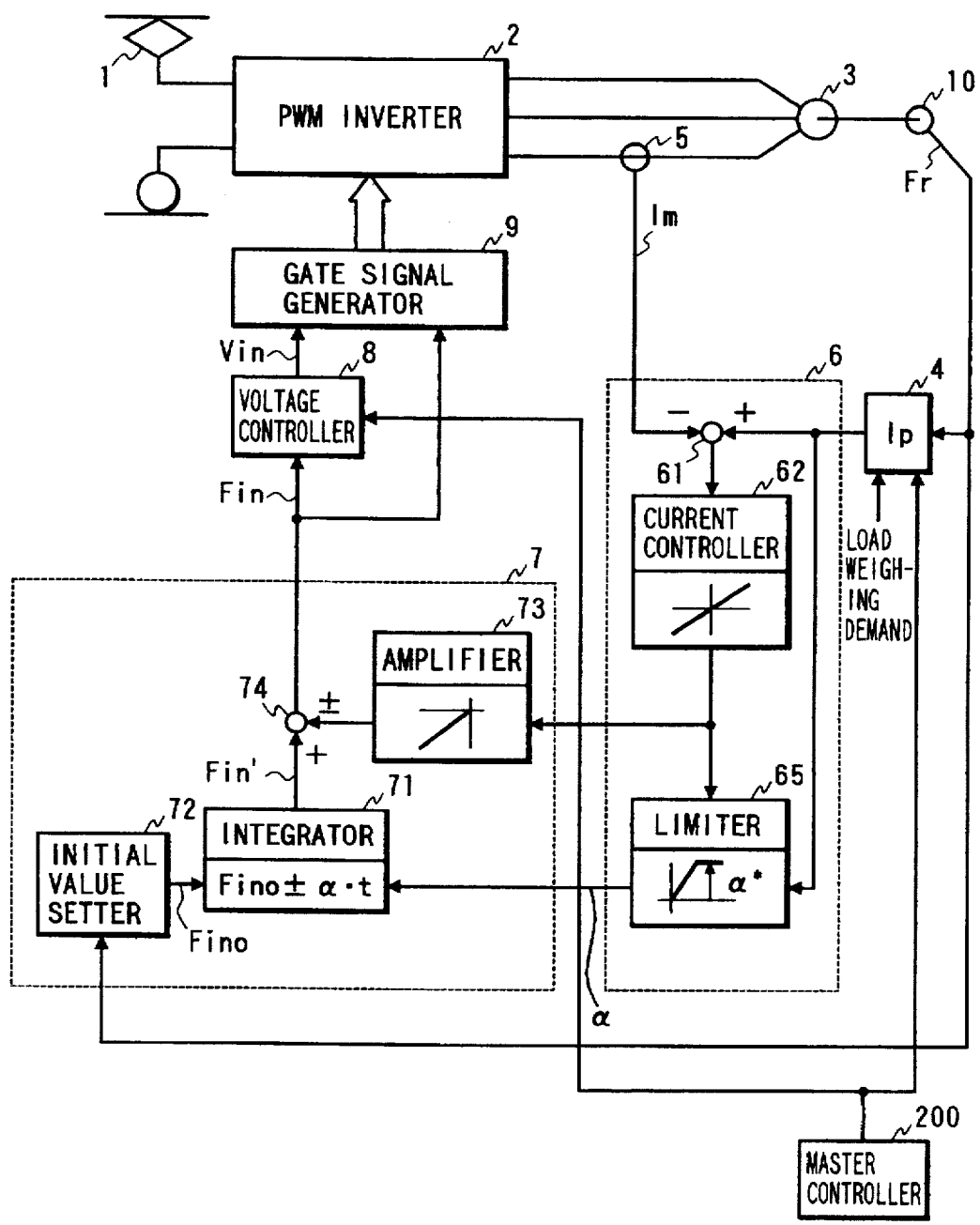
FIG. 4 is a schematic circuit diagram of a second embodiment of the invention.

A SECOND EMBODIMENT:

A circuit configuration of a second embodiment of the invention is shown in FIG. 4., which differs from the first embodiment of FIG. 1 in that its frequency-to-time rate-of-change command generation means 6 and inverter output frequency command generation means 7 have a different configuration from those in the first embodiment. Namely, a modified frequency-to-time rate-of-change command generation means 6 is further with a limiter 65 to limit an upper value for frequency-to-time rate-of-change command $\alpha$ to a reference value $\alpha^*$ which is greater than a frequency-to-time rate-of-change which corresponds to an acceleration or deceleration of the vehicle. The reference value $\alpha^*$ for the frequency-to-time rate-of-change command $\alpha$ is set on the basis of an estimated frequency-to-time rate-of-change corresponding to the acceleration or deceleration of the vehicle which has been assumed from a current command Ip. This estimation of acceleration or deceleration my be implemented by calculating acceleration consecutively from a current command Ip, but it may also be retrieved from a table defining a relationship between the current command Ip and the reference value $\alpha^*$ on demand.

Further, the inverter output frequency command generation means 7 in the second embodiment of the invention is further provided with an amplifier 73 and an adder/subtractor 74, whereby when an output from the current controller 62 becomes a negative value, that is, when an inverter output current Im>a current command Ip, that negative output is amplified by the amplifier 73, and then an amplified negative output from the amplifier 73 is added (during powering) or subtracted (during regeneration) to or from an output Fin' from an integrator 71, so as to output inverter output frequency command Fin. The amplifier 73 and the adder/subtractor 74 are provided to improve the response characteristics of inverter output current Im, however; they are not necessarily required in the basic configuration of the invention. Other components are the same as those in the embodiment of FIG. 1.

In the aforementioned circuit configuration of the second embodiment of the invention, as in the first embodiment of FIG. 1, the frequency-to-time rate-of-change command α is controlled such that the inverter output current Im becomes identical to the current command Ip, and thereby, an increment (during powering) or decrement (during regeneration) in inverter output frequency command Fin in response to a frequency-to-time rate-of-change command α is adapted to become identical to an increase or decrease in rotor frequency Fr of the induction motor 3, namely, the resultant slip frequency becomes constant. However, when the inverter output current Im becomes smaller than the associated current command Ip so as to cause the frequency-to-time rate-of-change command α to increase to a value in the vicinity of the reference value α* which is greater than the frequency-to-time rate-of-change (rotor frequency-to-time rate-of-change for the induction motor 3) corresponding to an actual acceleration or deceleration of the vehicle, the slip frequency is caused to increase gradually in accordance with a difference between the reference value α* for the frequency-to-time rate-of-change command α and the frequency-to-time rate-of-change corresponding to the acceleration or deceleration of the vehicle, and thereby the motor current, i.e., inverter output current Im is caused gradually to become equal to the current command Ip.

Now, with reference to FIG. 5, respective slip phenomena associated with respective control methods of the embodiment of the invention of FIG. 4, and the prior art constant current control method, as well as the frequency rate-of-change control method described in document (2) will be described in detail.

Figure 5A:
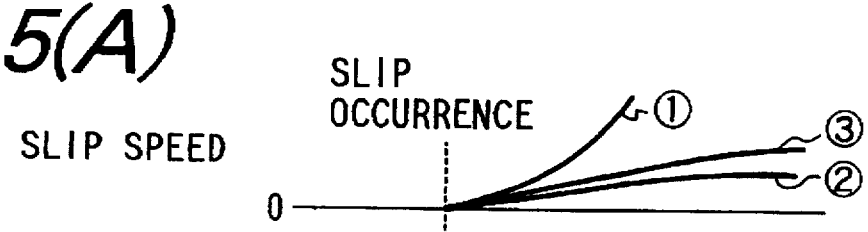
FIGS. 5(A) to 5(D) are diagrams showing slip phenomena and its control in the second embodiment of the invention.
Figure 5B:
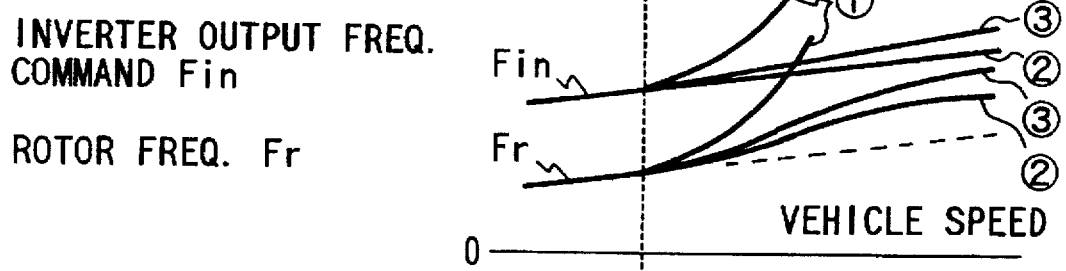
Figure 5C:
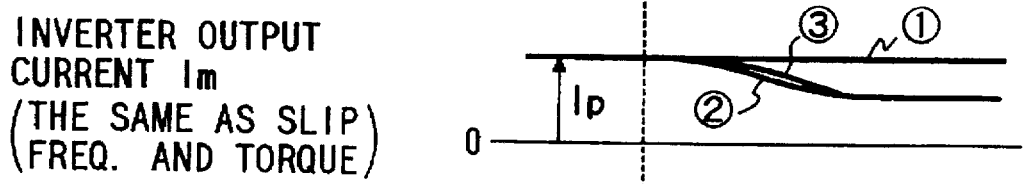

In the drawing, according to the conventional constant current control method depicted by ①, when a slip occurs, the rotor frequency Fr of the induction motor 3 increases, thereby an associated slip frequency, namely, inverter output current (motor current) Im is caused to decrease, but this is in vain due to suppression by the constant current control system, and thereby, Im does not change basically as indicated by ① in FIG. 5(C). Thereby, due to a failure to reduce the torque, rotor frequency Fr continues to increase as indicated by ① in FIG. 5 (B), and its slip ① is further promoted as indicated in FIG. 5(A), leading to a catastrophic slip phenomenon.

According to the conventional frequency rate-of-change control method depicted by ② in FIGS. 5(A) to 5(D), when a slip occurs, the increment of rotor frequency Fr of the induction motor 3 tends to become greater than the increment of inverter output frequency command Fin (in response to frequency-to-time rate-of-change command α) as shown in FIG. 5 (B), and thereby the slip frequency, namely, inverter output current Im is caused to decrease, as shown in FIG. 5(C), thereby reducing the torque as well. As a result, the increment of the rotor frequency Fr is caused to decrease to become substantially equal to the increment of the inverter output frequency command Fin which dependency on a predetermined frequency-to-time rate-of-change command α. Namely, provided that a given acceleration of the vehicle is maintained, the slip will not develop any further, and will be balanced as indicated by ② in FIG. 5 (A). If adhesion is recovered between the rail and wheel in this condition, a self-readhesion can be expected to occur. However, in order to ensure and enhance readhesion, it is necessary to carry out a readhesion control.

Figure 5D:
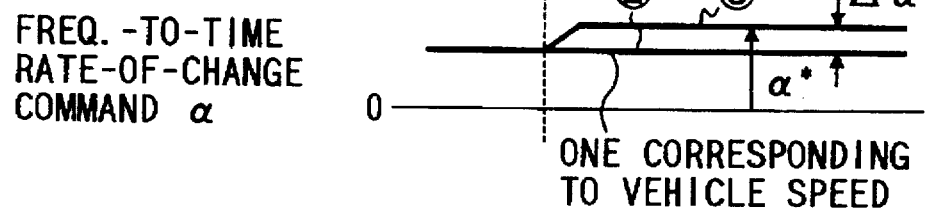

In contrast to the aforementioned conventional methods, according to the second embodiment of the invention, as shown in FIG. 4, the results of which are indicated by ③ in FIGS. 5(A) to (D), when a slip occurs, an increment of rotor frequency Fr of the induction motor 3 tends to become greater than the increment of inverter output frequency command Fin (in response to frequency-to-time rate-of-change command α) as shown in FIG. 5(B), and the associated slip frequency, namely, the inverter output current Im is caused to decrease to a smaller value than the current command Ip as indicated in FIG. 5(C), and thereby the torque is caused to decrease as well. As a result, the frequency-to-time rate-of-change command α is adapted to take a reference value α* which is greater than a frequency-to-time rate-of-change which corresponds to acceleration of the vehicle as indicated in FIG. 5(D), and thereby, the increment of the rotor frequency Fr is suppressed to become substantially equal to the increment of the inverter frequency command Fin, which is in accordance with the reference value α* as shown in FIG. 5(B). Namely, in accordance with a difference Δα between the reference value α* for the frequency-to-time rate-of-change command α and the frequency-to-time rate-of-change which corresponds to the acceleration of the vehicle, the slip is controlled to increase slowly as indicated in FIG. 5(A). Therefore, if adhesion between the rail and wheels is recovered in this condition before the slip develops too greatly, a self-readhesion may well be expected to take place similar to that produced by the conventional frequency rate-of-change control method indicated by ② in FIG. 5(A). However, in order to ensure and enhance readhesion, it is necessary to perform readhesion control as will be described later.

The slip phenomena during powering has been described above, and, any skid phenomenon during regeneration may well be explained in the same manner as described above.

As described above, according to the embodiment of FIG. 4 of the invention, advantages have been realized in addition to the advantages of the first embodiment of FIG. 1 in that, since the frequency-to-time rate-of-change command α is adapted not to exceed the reference value α*, which is greater than the frequency-to-time rate-of-change which corresponds to the acceleration or deceleration of the vehicle, a catastrophic slip or skid is not likely to occur, and self-readhesion can be expected to take place depending on particular rail conditions, including when the adhesion between the rail and wheels is temporarily lowered due to smeared oil, for example.

Figure 6:
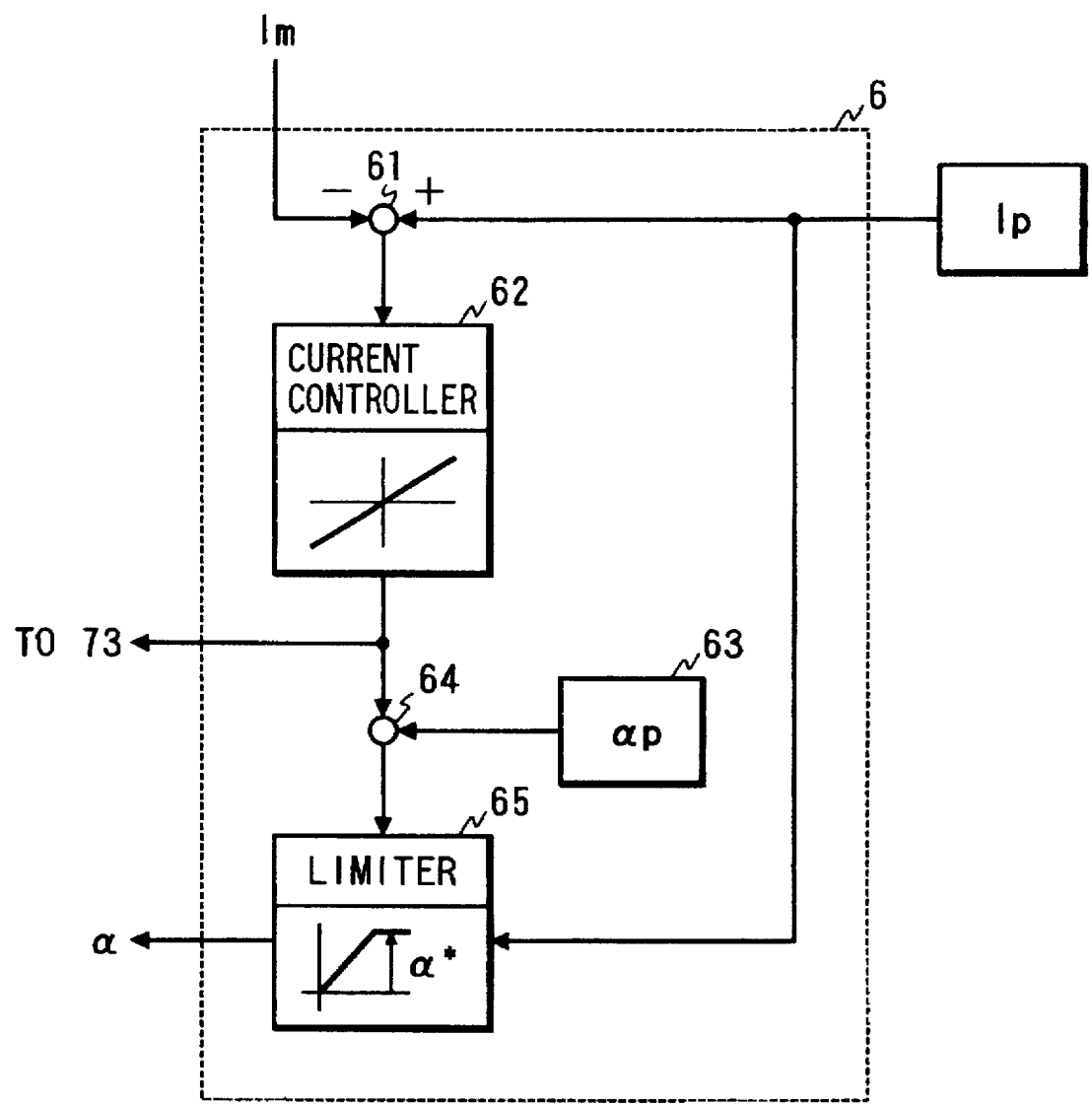
FIG. 6 is a circuit diagram which shows another arrangement of frequency-to-time rate-of-change generation means 6 depicted in FIG. 4.

With reference to FIG. 6, a modified arrangement of the frequently-to-time rate-of-change command generation means 6 is shown in which means 63 is provided for generating a predetermined frequency-to-time rate-of-change command αp, and αp is added in an adder 64 to an output from current controller 62 in response to a difference between the current command Ip and the detected inverter output current Im, and then through a limiter 65, a frequency-to-time rate-of-change command α is output. This modified arrangement should be construed to attain the same operation and effects as the foregoing embodiments of the invention.

Further, in the embodiments of FIGS. 4 and 6, the reference value α* for the frequency-to-time rate-of-change command α, which is greater than any frequency-to-time rate-of-change corresponding to an actual acceleration or deceleration of the vehicle, and which is for use in the limiter 65 in the frequency-to-time rate-of-change command generation means 6, has been obtained from the current command Ip. However, the actual acceleration or deceleration of the vehicle may be obtained according to either one of the following steps as well.

Figure 7:
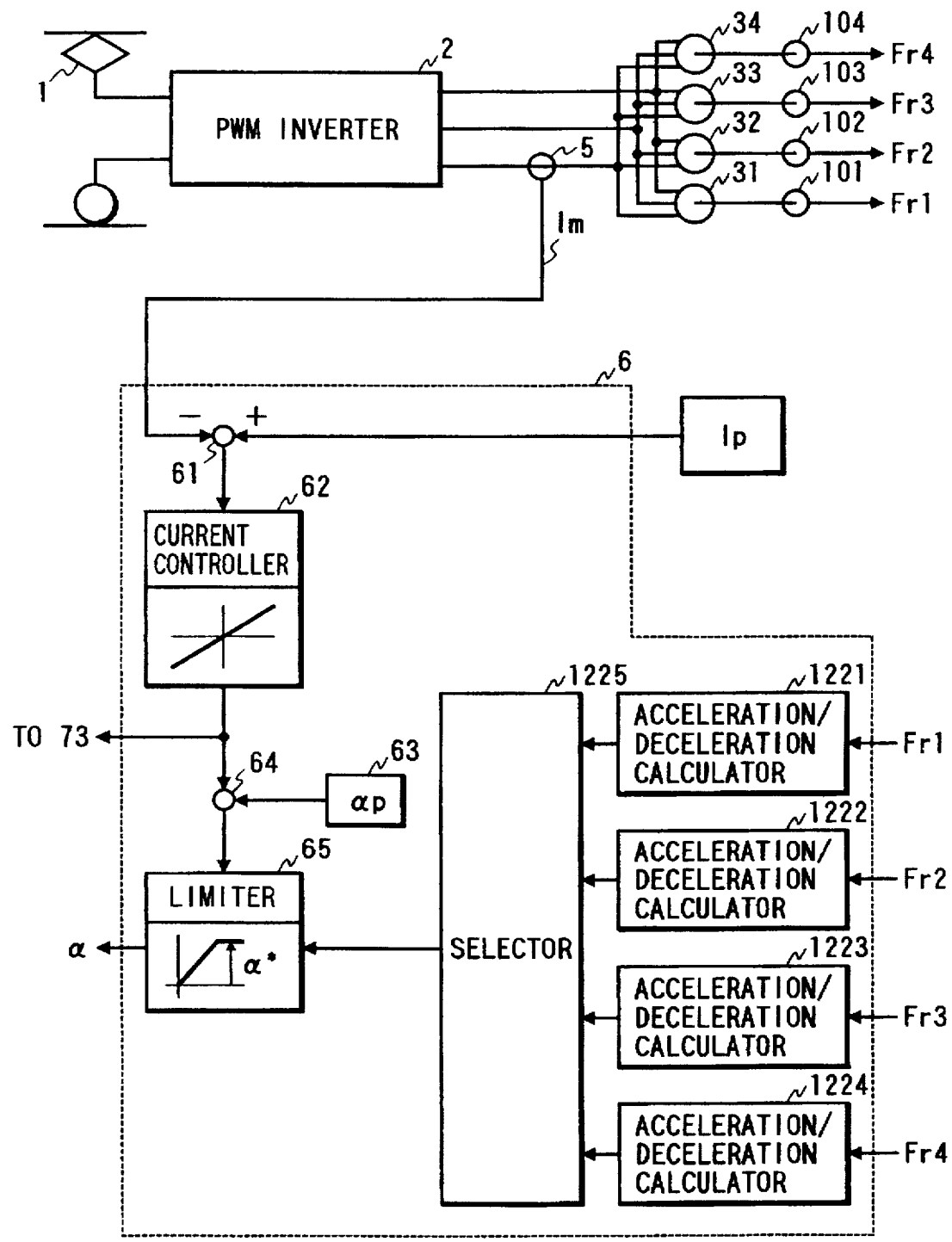
FIG. 7 is a block diagram of an arrangement for use in the embodiment of FIG. 4 for detecting actual acceleration of the vehicle.

(Step 1) Since the vehicle is generally driven by a plurality of induction motors, respective frequency-to-time rates-of-change corresponding to actual acceleration or deceleration of the vehicle are calculated from respective rotor frequencies of these respective induction motors, and then an appropriate value is either selected from among them or averaged, which is further added, for example, to a predetermined value $\Delta\alpha$, so as to define a reference value $\alpha^*$. With reference to FIG. 7, a plurality of induction motors 31, 32, 33, 34 are provided with rotor frequency detectors 101, 102, 103, 104, respectively. These rotor frequency detectors output rotor frequencies Fr1 to Fr4 which are input into acceleration/deceleration calculators 1221 to 1224, respectively, to calculate respective accelerations or decelerations. Then, in a selector 1225, a minimum value is selected at the time of powering (the next minimum value is selected if the minimum value allows detection of a vibration due to a rail joint), and a maximum value is selected at the time of regeneration (the next maximum value is selected if any problem is anticipated), thereby an actual acceleration of the vehicle is obtained. This output indicative of the actual acceleration is increased to an even greater value in the limiter 65 to provide a proper reference value $\alpha^*$.

(Step 2) A frequency-to-time rate-of-change corresponding to any instance of acceleration or deceleration of the vehicle is calculated from the revolution of a non-driving wheel (accompanying wheel), and then this calculated value is processed, for example, by adding a predetermined value $\Delta\alpha$ to define a reference value $\alpha^*$ (not shown). This step can yield a relatively more accurate acceleration though it requires that the non-driving wheel must not be subjected to air braking during such measurements.

(Step 3) A frequency-to-time rate-of-change corresponding to any instance of acceleration or deceleration of the vehicle is estimated from an inverter output current (motor current), and then this estimated value is further processed, for example, by adding a predetermined value $\Delta\alpha$ to define a reference value $\alpha^*$ (not shown). Although this step requires that a load factor be taken into account, such as a passenger load factor and/or rail gradients in order to define an appropriate reference value $\alpha^*$, there is an advantage in that a rotor frequency detector is not necessary for calculation of acceleration or deceleration.

A THIRD EMBODIMENT:

Now, the circuit configuration of a third embodiment of the invention will be described with reference to FIG. 8. The third embodiment of the invention differs from the second embodiment of FIG. 4 in that the respective arrangements of its frequency-to-time rate-of-change command generation means 6 and inverter output frequency command generation means 7 are different from those of the second embodiment. Namely, in the frequency-to-time rate-of-change command generation means 6 in FIG. 8, the limiter 65 depicted in FIG. 4 is eliminated, and instead reference generating, means 67 is provided therein for generating a reference frequency-to-time rate-of-change $\alpha^*$ which is greater than any frequency-to-time rate-of-change corresponding to actual acceleration or deceleration of the vehicle. Further, a current controller 66 therein is adapted, when the inverter output current Im becomes greater than the current command Ip, to output an adjustment quantity $\Delta\alpha i$ (negative value) for adjusting the reference frequency-to-time rate-of-change $\alpha^*$ in accordance with the difference between Im and Ip. Then, $\Delta\alpha i$ output from the current controller 66 is added to reference frequency-to-time rate-of-change $\alpha^*$ in adder 68 to produce an updated frequency-to-time rate-of-change $\alpha$. The reference frequency-to-time rate-of-change command $\alpha^*$ is generated in the same manner as in the embodiment of FIG. 4, namely, on the basis of an estimated frequency-to-time. rate-of-change corresponding to the acceleration or deceleration of the vehicle, which will be estimated from a current command Ip. Further, in the inverter output frequency command generation means 7, a multiplier 75 is provided instead of the amplifier 73 indicated in FIG. 4, to multiply the output $\Delta\alpha i$ from current controller 66 by Ki, and then this multiplied value $\Delta\alpha i \cdot Ki$ is added (during powering) or subtracted (during regeneration) to or from an output Fin' from integrator 71 in adder/subtractor 74 so as to output an inverter output frequency command Fin. The multiplier 75 and adder/subtractor 74 are advantageous for improving the response of the inverter output current Im to be controlled when the inverter output current Im tends to become greater than the current command Ip similar to the embodiment of FIG. 4, however, they are not necessarily required in principle. Other arrangements and functions are the same as in the embodiment of FIG. 4.

With this circuit configuration as described above, in the case where the inverter output current Im becomes smaller than the current command Ip, $\Delta\alpha i$ output from the current controller 66 becomes 0, and the frequency-to-time rate-of-change command $\alpha$ takes a value of reference frequency-to-time rate-of-change command $\alpha^*$ which is greater than any associated frequency-to-time rate-of-change corresponding to actual acceleration or deceleration of the vehicle (i.e., frequency-to-time rate-of-change for the rotor frequency of the induction motor 3). Thereby, as in the embodiment of FIG. 4, the slip frequency of the motor 3 is caused to increase slowly in dependency on a difference between the reference frequency-to-time rate-of-change command $\alpha^*$ and the frequency-to-time rate-of-change corresponding to the acceleration or deceleration of the vehicle, and thereby the motor current, namely, inverter output current Im, is caused to increase slowly to coincide with the current command Ip.

Next, in the case where the inverter output current Im becomes greater than the current command Ip, the current controller 66 generates output $\Delta\alpha i$ (negative value). This $\Delta\alpha i$ output from the current controller 66 compensates for a difference between the reference frequency-to-time rate-of-change command $\alpha^*$ and the frequency-to-time rate-of-change corresponding to the acceleration or deceleration of the vehicle (an adjustment quantity is determined by a difference between the reference frequency-to-time rate-of-change command $\alpha^*$ and the frequency-to-time rate-of-change corresponding to an actual acceleration of the vehicle, and during a normal powering condition, the adjustment is carried out by the current controller 66), and thereby the frequency-to-time rate-of-change command $\alpha$ is adjusted to become equal to the frequency-to-time rate-of-change corresponding to the acceleration or deceleration of the vehicle. That is, an increment in the inverter output frequency command Fin is adapted to become equal to an increment in the rotor frequency Fr of the induction motor 3, namely, the slip frequency becomes constant, and the inverter output current Im is adapted to become slightly larger than the current command Ip by a value corresponding to Δαi. Therefore, the frequency-to-time rate-of-change command α is adapted to become equal to a value corresponding to a given current command Ip (which is nearly equal to an inverter output current Im), and thereby the vehicle is ensured to be accelerated or decelerated at a torque substantially corresponding to the current command Ip.

The operation described above relating to the third embodiment is the same in principle as that of the embodiment of FIG. 4, and it should be construed that the operation thereof upon occurrence of a slip or skid is also the same as in the embodiment of FIG. 4.

Figure 8:
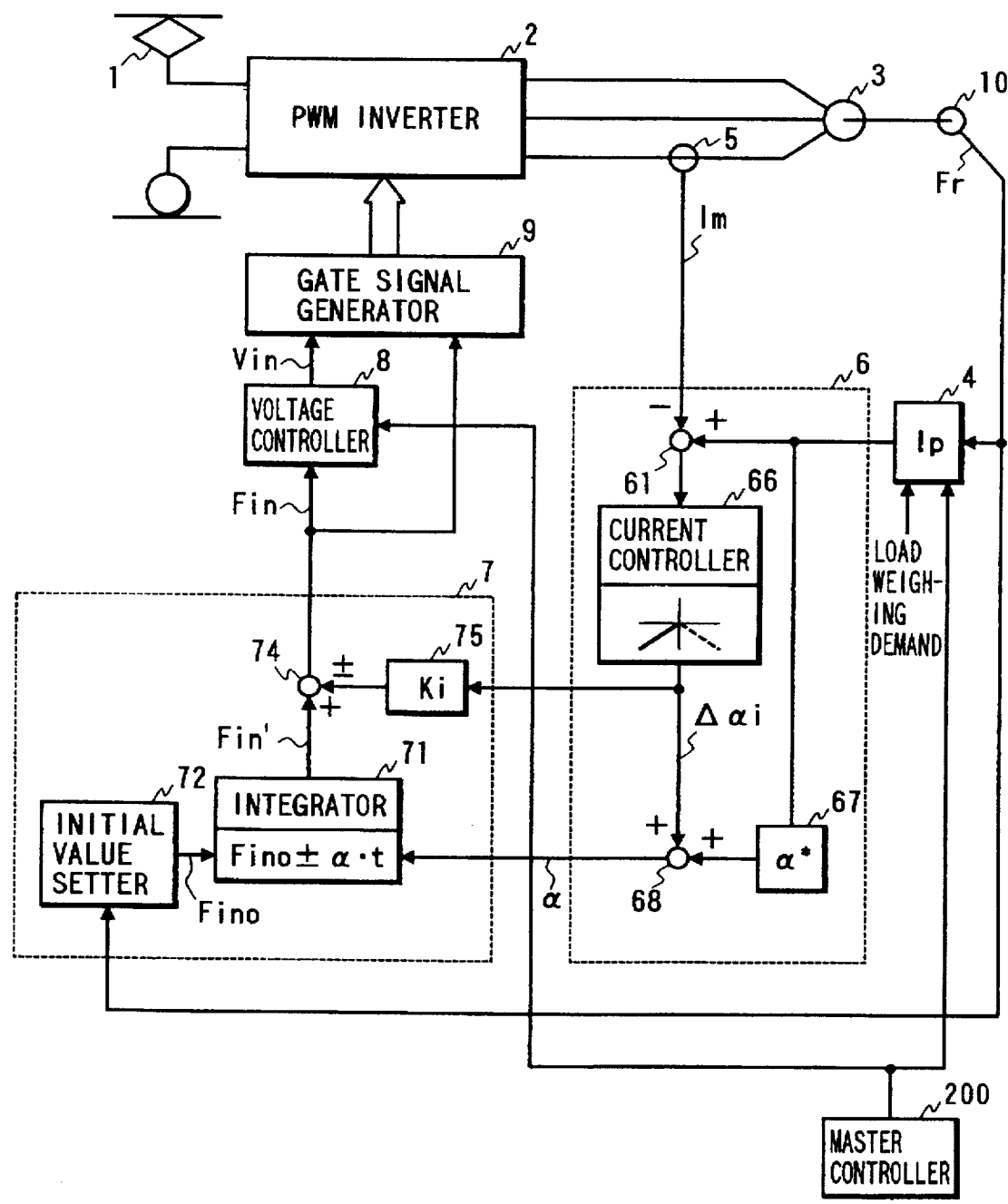
FIG. 8 is a schematic circuit diagram indicative of a third embodiment of the invention.

Therefore, according to the third embodiment of FIG. 8 of the invention, the same advantages as those provided by the embodiment of FIG. 4 can be attained.

However, in the third embodiment of FIG. 8, the means 67 for generating reference frequency-to-time rate-of-change command α*, which is larger than any associated frequency-to-time rate-of-change corresponding to an actual acceleration or deceleration of the vehicle, may be comprised of either one of the following arrangements already referred to with respect to FIG. 7.

(Arrangement 1) In general, since the vehicle is driven by a plurality of induction motors, the frequency-to-time rates-of-changes corresponding to actual acceleration or deceleration of the vehicle may be calculated from respective rotor frequencies of a plurality of induction motors, and an appropriate one either selected from among calculated values or averaged, and then, thus the selected one maybe further processed, for example, by adding a predetermined value Δα thereto so as to generate a proper reference frequency-to-time rate-of-change command α*.

(Arrangement 2) In this arrangement, a frequency-to-time rate-of-change corresponding to actual acceleration or deceleration of the vehicle is calculated from revolutions of a non-driving wheel (accompanying wheel), and this calculated value is further processed, for example, by adding a predetermined value Δα thereto so as to generate a proper reference frequency-to-time rate-of-change command α*.

(Arrangement 3) A frequency-to-time rate-of-change corresponding to the acceleration or deceleration of the vehicle is estimated from the inverter output current (motor current), and then this estimated value is further processed, for example, by adding a predetermined value Δα thereto, thereby to generate a proper reference frequency-to-time rate-of-change command α*.

A FOURTH EMBODIMENT:

The circuit configuration of a fourth embodiment of the invention will now be described with reference to FIG. 9. The fourth embodiment of the invention represents a variation of the third embodiment of FIG. 4 in that readhesion control means 11 is added thereto. Further, them aster controller 200 is omitted in the following descriptions of the drawings to simplify the description. In this readhesion control means 11, a rotor frequency differential ΔF between an equivalent rotor frequency Ft which was obtained from a vehicle speed, i.e., the number of revolutions of a non-driving wheel detected by a detector (not shown) mounted on the wheel axis of the accompanying wheel and converted to a rotor frequency equivalent to that of induction motor 3, and a rotor frequency Fr of the induction motor 3 is obtained by subtracting Ft from Fr at the time of powering, and by subtracting Fr from Ft at the time of regenerating in subtractor 111. When this rotor frequency differential ΔF is smaller than a detection threshold value Fk for detecting a slip (during powering) or skid (during regeneration), a coefficient multiplier 112 is caused to output a coefficient Kc of 1, and when this value ΔF is larger than Fk, the coefficient multiplier 112 is caused to output a coefficient Kc which is smaller than 1. Then, a coefficient Kc from the coefficient multiplier 112 and a frequency-to-time rate-of-change command α' (α in FIG. 4) from the frequency-to-time rate-of-change command generation means 6 are multiplied in multiplier 113 to output an updated frequency-to-time rate-of-change command α. By way of example, a value of the coefficient Kc output from the coefficient multiplier 112, which is smaller than 1, should be a value that ensures that the frequency-to-time rate-of-change command α will become smaller than the frequency-to-time rate-of-change corresponding to the acceleration or deceleration of the vehicle. Other arrangements are the same as in the embodiment of FIG. 4.

Figure 9:
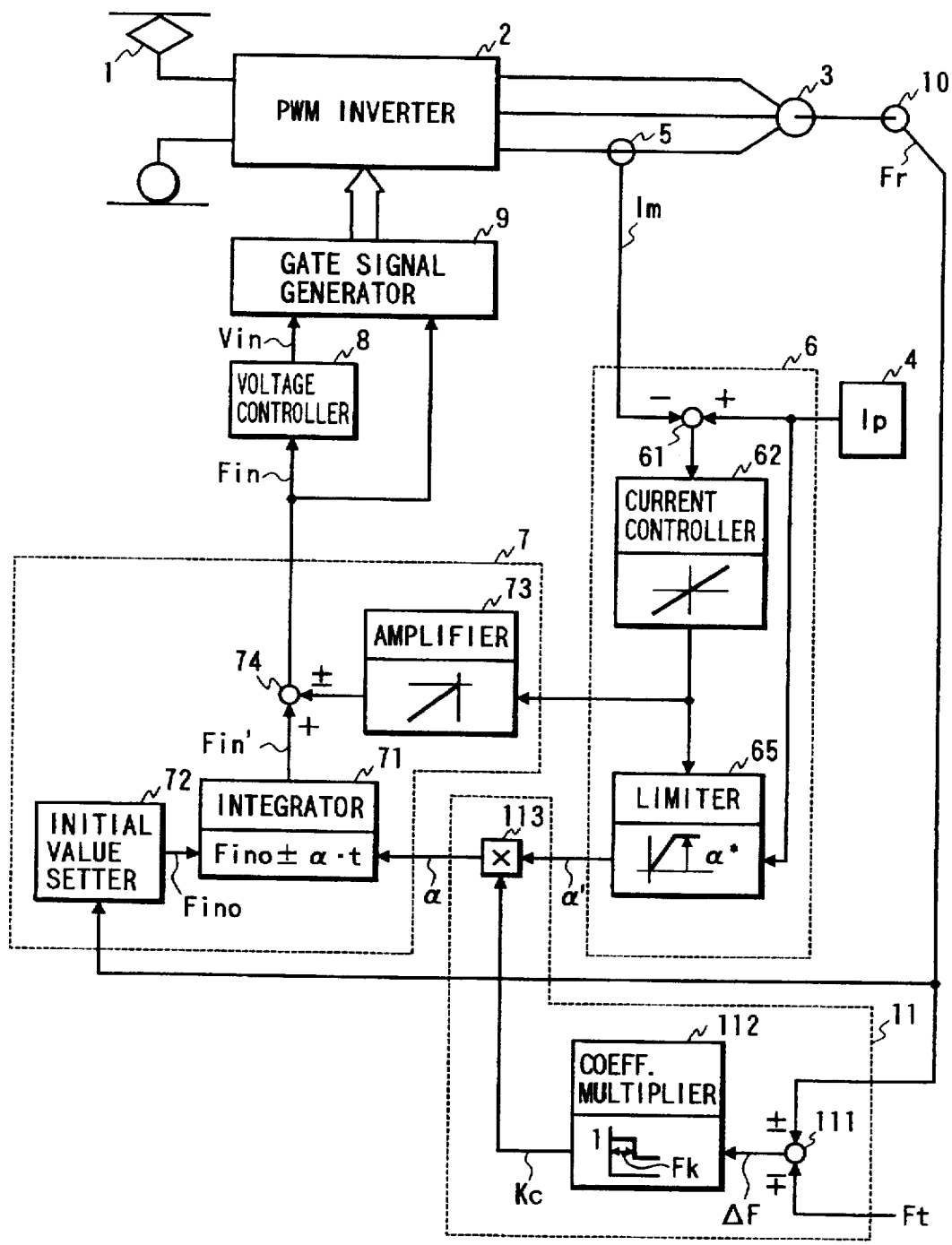
FIG. 9 is a schematic circuit diagram indicative of a fourth embodiment of the invention.

In the fourth embodiment of FIG. 9 of the invention, the operation during an instance where no slip/skid is present (that is, when coefficient Kc output from coefficient multiplier 112 in the readhesion control means 11 is equal to 1) is the same as in the embodiment of FIG. 4. Fundamental operations thereof in an instance where a slip occurs during a powering or acceleration mode will be described in the following with reference to FIGS. 10(A) to 10(E).

Figure 10A:
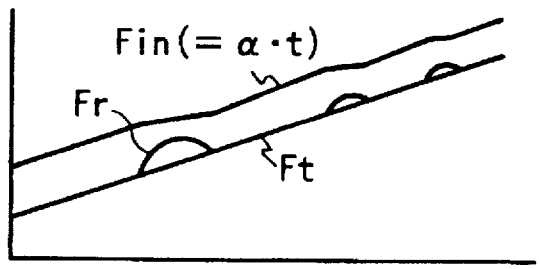
FIGS. 10(A) to 10(E) are schematic diagrams illustrative of the basic operation of the third embodiment depicted in FIG. 8.
Figure 10B:
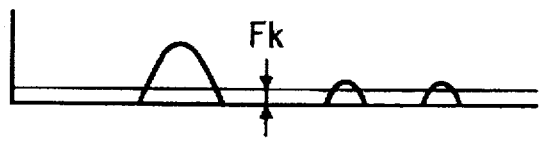
Figure 10C:
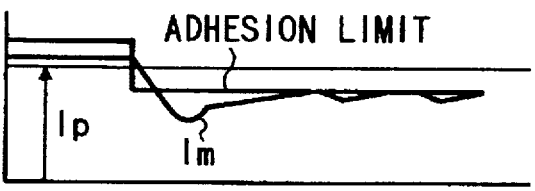

With reference to the drawings, when adhesion between the rail and wheels drops below the adhesion limit as indicated in FIG. 10(C) to cause the induction motor 3 to slip, an increment in the associated rotor frequency Fr becomes greater than an increment in associated inverter output frequency command Fin, as indicated in FIG. 10(A), and thereby an associated slip frequency, i.e., inverter output current (or motor current) Im is caused to drop rapidly, as indicated in FIG. 10(C), to become substantially smaller than the current command Ip. As a result, as described above, an output from the current controller 62, i.e., frequency-to-time rate-of-change command α', tends to increase only to be suppressed by the limiter 65 at a reference value α* which is larger than the frequency-to-time rate-of-change corresponding to any instance of acceleration of the vehicle.

Figure 10D:
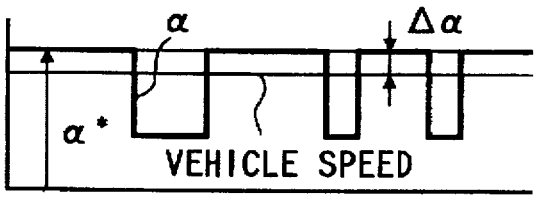
Figure 10E:
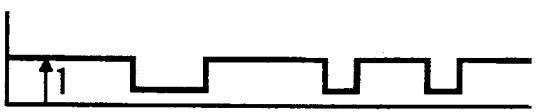

On the other hand, a rotor frequency differential ΔF (=Fr-Ft) between rotor frequency Fr and the non-driving wheel's equivalent rotor frequency (vehicle speed) Ft becomes greater, as indicated in FIG. 10(B), and when the value of ΔF becomes larger than a detection level Fk, the value of coefficient Kc output from the coefficient multiplier 112 becomes smaller than 1, as indicated in FIG. 10(E). As a result, since the frequency-to-time rate-of-change command α drops below the frequency-to-time rate-of-change corresponding to the acceleration of the vehicle, as indicated in FIG. 10(D), the induction motor 3 is prompted to recover self-adhesion, and thereby the slip frequency (motor current), i.e., inverter output current Im turns from a decrease to an increase, as indicated in FIG. 10(C), and readhesion is readily recovered. Upon recovery of readhesion, the coefficient Kc output from the coefficient multiplier 112 resumes a value of 1, and then the frequency-to-time rate-of-change command α takes a reference value α* which is larger than the frequency-to-time rate-of-change corresponding to any instance of acceleration of the vehicle, as indicated in FIG. 10(D), so that the slip frequency (motor current), i.e., inverter output current Im is caused to gradually increase, as indicated in FIG. 10(C), in accordance with a differential Δα between the reference value α* and the frequency-to-time rate-of-change corresponding to the acceleration of the vehicle. Under such a condition where slip and readhesion will recur before, inverter output current Im increases to a given current command Ip, the frequency-to-time rate-of-change command α is controlled (adjusted)

to become substantially equal, on average, to the frequency-to-time rate-of-change corresponding to the acceleration of the vehicle (which is indicated to be constant in FIG. 10(D)) by the readhesion control means 11, and so that drive torque of the induction motor 3 is adapted to correspond on average to the adhesion limit, as indicated in FIG. 10(C). That is, the frequency-to-time rate-of-change command α on average is adapted basically to correspond to the adhesion limit, and thereby, the vehicle is ensured to be accelerated on average at a torque substantially corresponding to a given rail condition.

Further, in case the readhesion control means 11 is subjected to a faulty operation due to running over the rail joints or the like, during this faulty operation its frequency-to-time rate-of-change command α is caused to decrease, which decrease, however, is smaller than that produced by the readhesion control method according to the conventional one disclosed in document ① in which, upon detection of a slip, the slip frequency or current command is controlled in accordance with a fixed pattern to directly reduce or suppress the torque. Thus, a resultant decrease of torque according to the readhesion control method of the invention is smaller, and thereby, the acceleration property of the vehicle is not impaired significantly. Namely, this embodiment of the invention is arranged to permit or accommodate faulty operations, and thereby the detection level Fk for detecting a slip can be set at a smaller value than the values set by the conventional apparatus and methods. Therefore, since a relatively small quantity of intrinsic slip can be detected and readhesion thereof is ensured by this embodiment of the invention, the acceleration performance of the vehicle (readhesion characteristics) can be further improved.

Further, there is another advantage according to the readhesion control method of the invention in that, since torque is not directly suppressed, in case a single inverter is adapted to control a plurality of induction motors, a torque for non-slip induction motors is not suppressed in excess of what is necessary, and thereby, the acceleration characteristics (readhesion characteristics) will be improved.

The fundamental operation of the invention as described above is applicable in principle to the cases of regeneration/deceleration modes as well.

Further, in order to ensure that readhesion will be attained satisfactorily, it is advantageous for a detection level set value Fk (Fko) at which an output coefficient Kc of the coefficient multiplier 112 changes from 1 to a value smaller that 1 to differ from a detection level set value Fk (Fkf) at which an output coefficient Kc of the coefficient multiplier 112 changes from a value smaller than 1 to a value of 1, thereby introducing a hysteresis such that Fko>Fkf.

According to the fourth embodiment of FIG. 9 described above, there is an advantage, in addition to the advantage of the embodiment of FIG. 4, in that, under conditions of presence of a slip/skid, since the frequency-to-time rate-of-change command α is modified (more particularly, to become smaller than the frequency-to-time rate-of-change that corresponds to the actual acceleration or deceleration of the vehicle) by the readhesion control means 11, self-readhesion is further enhanced, and thereby the vehicle can be accelerated or decelerated at an appropriate torque changeable precisely corresponding to the actual rail conditions.

By way of example, in the embodiment of FIG. 9, the vehicle speed that serves as a reference speed for detecting a slip/skid has been obtained from the revolution Fr of a non-driving wheel. However, in case there exists no non-driving wheel in a train, or it is difficult to mount a detector on any non-driving wheels, the actual speed of the vehicle can also be estimated by an arrangement to be described in the following.

Figure 11:
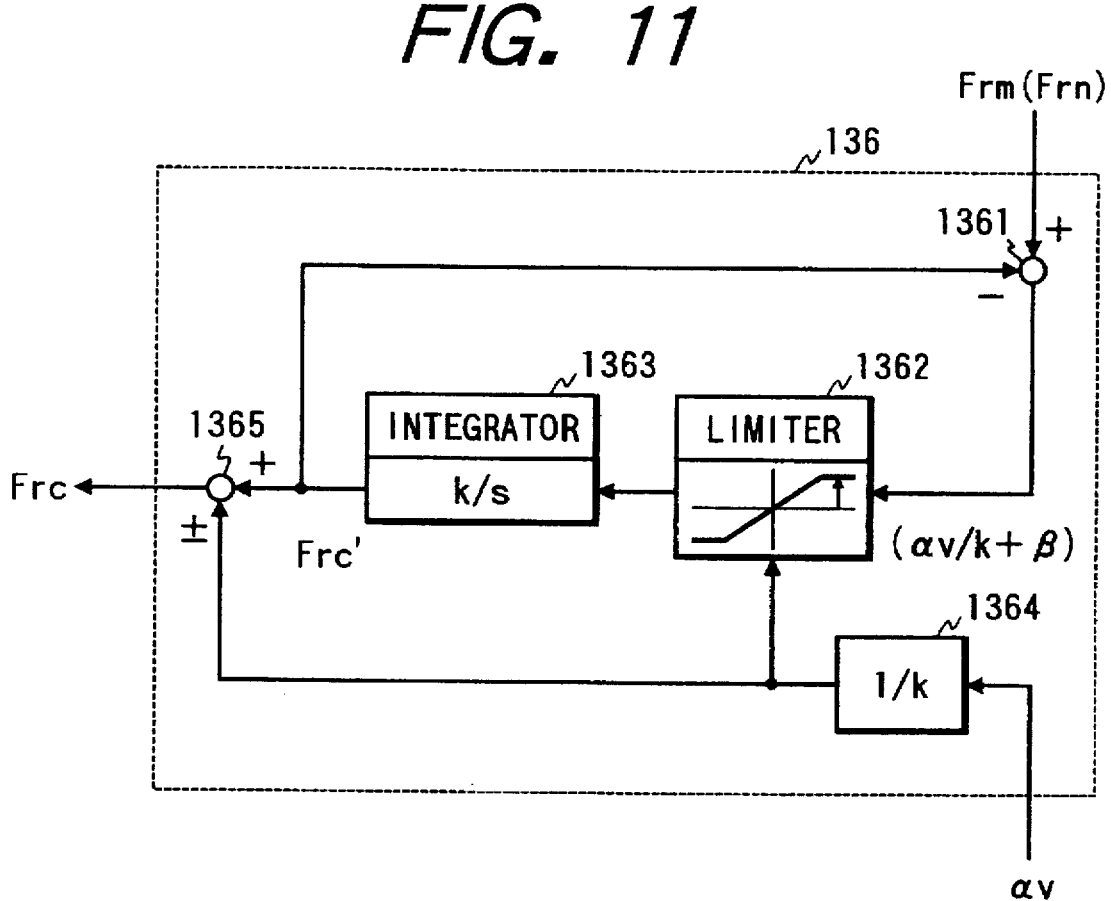
FIG. 11 is a schematic circuit diagram illustrative of means for estimating a speed of the vehicle.

With reference to FIG. 11, a vehicle speed estimator 163, forming an embodiment of the invention for estimating an actual speed of the vehicle, receives a motor's rotor frequency Fr, which is a rotor frequency of a driving wheel, and a vehicle's actual acceleration αv obtained by the aforementioned means (αv may be substituted by the frequency-to-time rate-of-change command reference value α*), and outputs an estimated value of actual vehicle speed (motor's rotor frequency converted value) Frc. This estimated value of actual vehicle speed Frc can be used instead of the non-driving wheel's revolution Ft. Further, as for the motor's rotor frequency Fr, in case the number of induction motors to be controlled by a single inverter is one, the number of revolutions thereof is input, and in case a plurality of induction motors are controlled, a maximum value Frm is input at the time of powering, and a minimum value Frn is input at the time of regeneration.

An output Frc' from integrator 1363 is subtracted from the motor's rotor frequency Fr in subtractor 1361, and the result of, subtraction is given to limiter 1362. The limiter 1362 has a limit value in plus and minus signs which is larger (smaller) by a predetermined value β than a value αv/k which is obtained by multiplying an actual vehicle acceleration or deceleration αv by 1/k in multiplier 1364, where k is a gain of integrator 1363. The result of subtraction from the subtractor 1361 is given to the integrator 1363 until the result of subtraction approaches the limit value, then when it exceeds the limit value, the limit value instead is given to the integrator 1363. At this instant, if the acceleration or deceleration of the rotor frequency Fr becomes equal to actual vehicle acceleration or deceleration αv, the difference between the rotor frequency Fr and the output Frc' from the integrator 1363 becomes equal to αv/k output from the multiplier 1364. Should this state be maintained, since Frc output from the vehicle speed estimator 136 will no longer represent the actual vehicle speed, αv/k output from the multiplier 1364 is added at the time of powering to Frc' output from the integrator 1363 in adder/subtractor 1365, or subtracted at the time of regeneration from the output Frc' of the integrator 1363, so as to output an estimated value Frc corresponding to the actual vehicle speed.

Use of this estimated value Frc instead of the revolution Ft of the non-driving wheel will eliminate the speed detector on the non-driving wheel for the purpose of detection of a slip/skid of the driving wheels.

Figure 12:
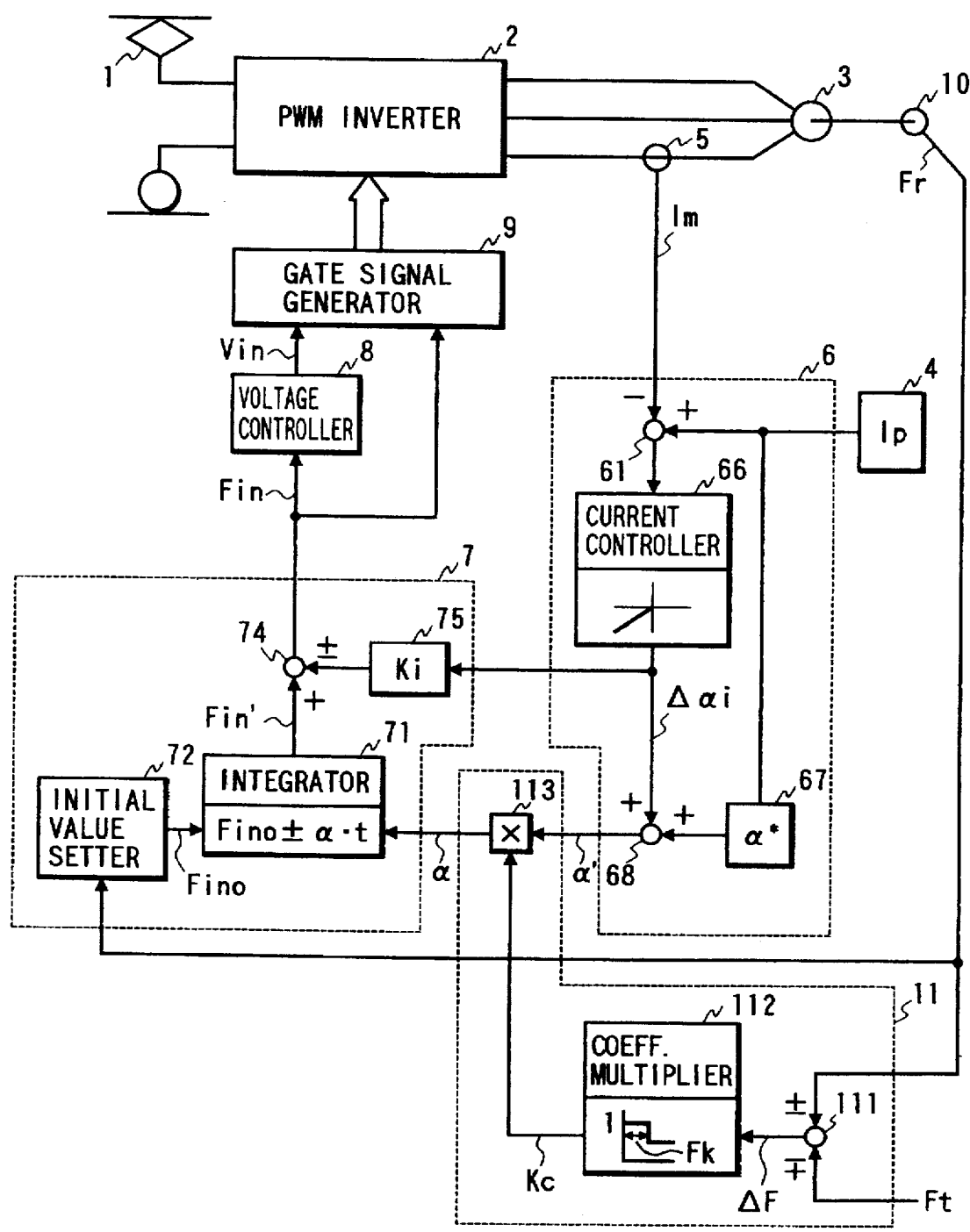
FIG. 12 is a schematic circuit diagram illustrative of a circuit configuration of a fifth embodiment of the invention.

A FIFTH EMBODIMENT:

With reference to FIG. 12, a circuit configuration of a fifth embodiment of the invention will be described. This circuit configuration of the fifth embodiment is comprised by adding the foregoing readhesion control means 11 described in the fourth embodiment of FIG. 9 to the third embodiment of FIG. 8 which operates in the same manner in principle as the second embodiment of FIG. 4. Therefore, the fifth embodiment of FIG. 12 operates in principle in the same manner as the fourth embodiment of FIG. 9 described above, that is, in the same manner as the second embodiment of FIG. 4 combined with the readhesion control means 11 Thus, it should be understood that the same advantage and effect as attained by the embodiment of FIG. 9 are attainable by the fifth embodiment as well. Further, an estimated value of Frc may be used instead of the revolution Ft of the non-driving wheel.

A SIXTH EMBODIMENT:

Still further, a circuit configuration of a sixth embodiment of the invention will be described with reference to FIG. 13.

This sixth embodiment of the invention differs from the fourth embodiment of FIG. 9 in that readhesion control means 11 of the former is modified to have a different arrangement from that of the latter, that is, the coefficient multiplier 112 and multiplier 113 are replaced by an amplifier 114 and a subtractor 115. Namely, in this readhesion control means 11 of the sixth embodiment, when a the rotor frequency differential $\Delta F$ becomes larger than a detection level Fk for the purpose of detection of a slip/skid, the amplifier 114 is caused to generate an output $\Delta\alpha c$ in accordance with a degree of this differential. This $\Delta\alpha c$ output from the amplifier 114 is subtracted in subtractor 115 from frequency-to-time rate-of-change command $\alpha'$ output from frequency-to-time rate-of-change command generation means 6 so as to output an updated frequency-to-time rate-of-change command $\alpha$. The other arrangements and operations thereof are the same as those described with respect to the fourth embodiment of FIG. 9.

Figure 13:
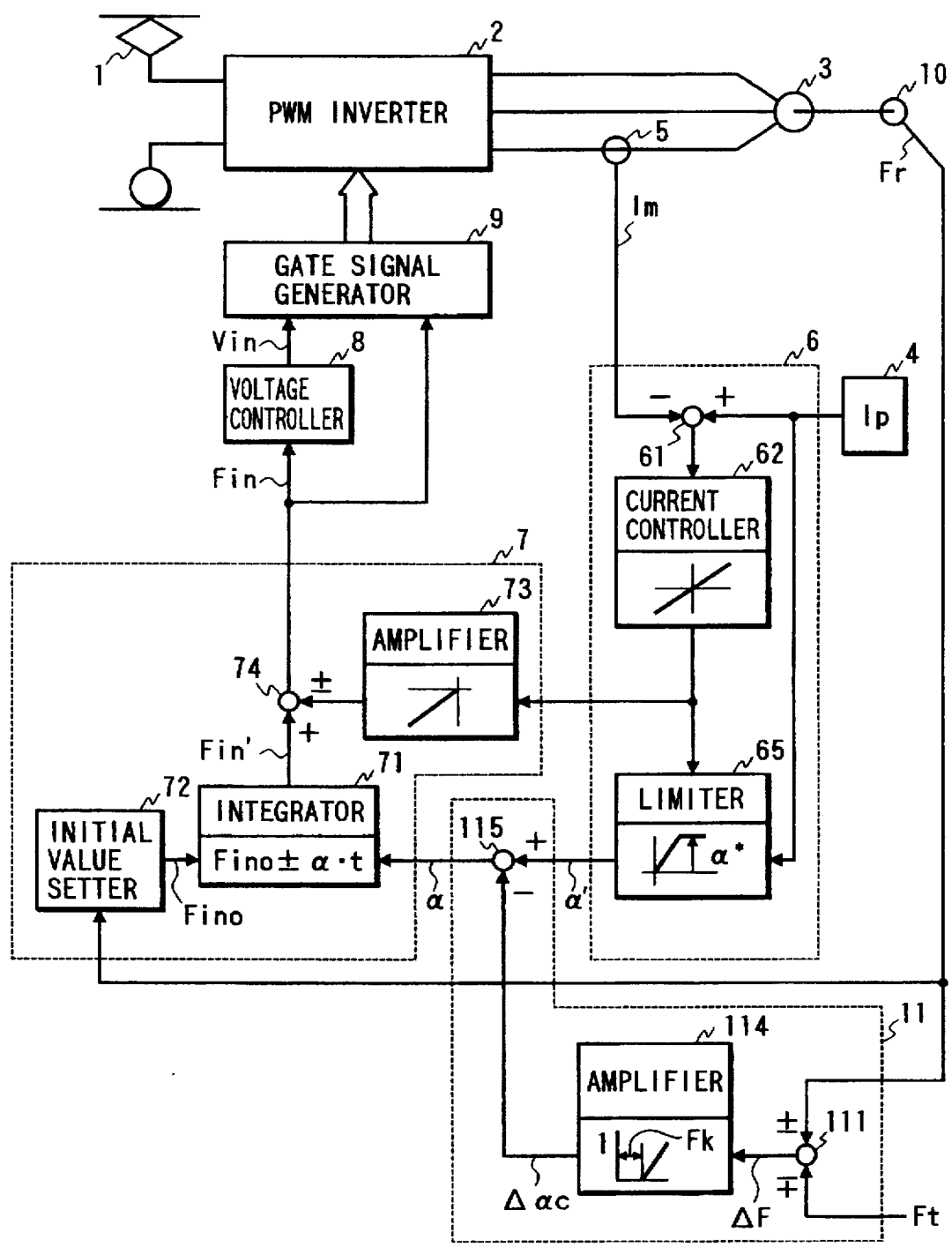
FIG. 13 is a schematic circuit diagram illustrative of a circuit configuration of a sixth embodiment of the invention.

In the sixth embodiment of FIG. 13, the basic operation thereof under presence of no slip/skid (when output $\Delta\alpha c$ from the amplifier 114 in the readhesion control means 11 is 0) is the same as that of the embodiment of FIGS. 9 or 4. Under presence of a slip/skid, since the frequency-to-time rate-of-change command $\alpha$ is adjusted (controlled) in accordance with rotor frequency differential $\Delta F$, the frequency-to-time rate-of-change command $\alpha$ is adapted basically to correspond to the adhesion limit, and so the vehicle is ensured to be accelerated or decelerated at a torque corresponding to the actual rail condition. Namely, the readhesion performance according to this sixth embodiment is further improved from that of the embodiment of FIG. 9

Figure 14:
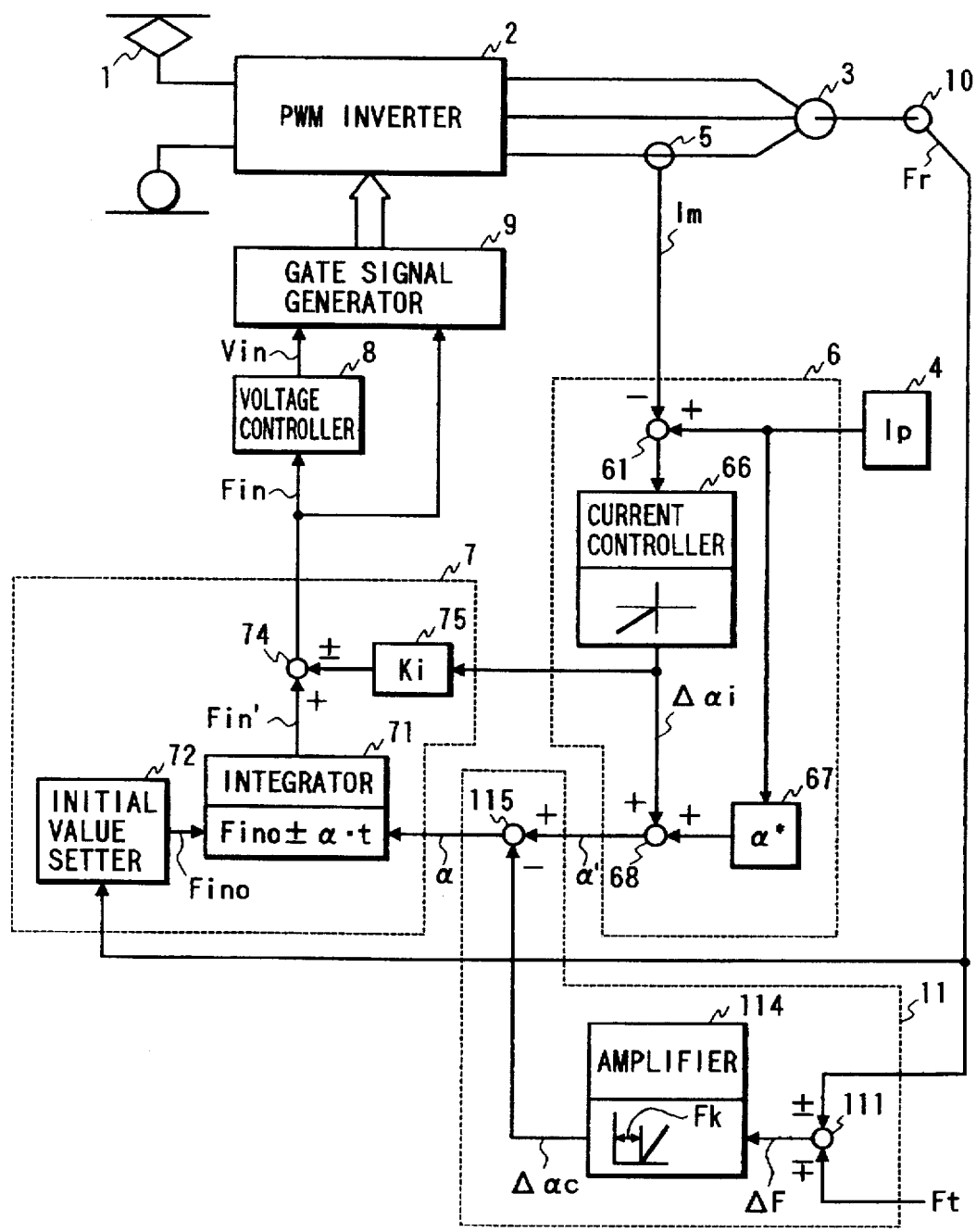
FIG. 14 is a schematic circuit diagram illustrative of a circuit configuration of a seventh embodiment of the invention.

A SEVENTH EMBODIMENT:

Another circuit configuration of a seventh embodiment of the invention is shown in FIG. 14, which comprises the same arrangement as the fifth embodiment of FIG. 12 which operates basically in the same manner as the fourth embodiment of FIG. 9, except that the readhesion control means 11 thereof is modified to have the arrangement of that in the sixth embodiment of FIG. 13. Therefore, the basic operation of this seventh embodiment of FIG. 14 is the same as that of the sixth embodiment of FIG. 13 described above (or the fourth embodiment of FIG. 9 when the readhesion control means 11 of which is modified to have the arrangement of that of FIG. 13), and therefore, it should be construed that the seventh embodiment of the invention attains the same advantage and effect as attained by the embodiments of FIG. 13 or FIG. 9.

By way of example, in the respective embodiments of FIGS. 9, 12, 13 and 14, the detection of a slip or skid in respective readhesion control means 11 has been carried out on the basis of a difference obtained between the rotor frequency Fr of the drive wheel and the rotor frequency Ft (or estimated value Frc) of the non-drive wheel. This has been done because detection of a slip or skid as well as of an instance of readhesion is readily possible. However, since the well-known conventional slip/skid detection method which uses a time-differential value of the drive wheel's rotor frequency entails a problem that readhesion is difficult to detect, it is necessary to use a separate readhesion detection means. However, it should be understood that any conventional readhesion control method may be adopted as readhesion control means 11 in these respective embodiments of the invention so long as it can detect a slip/skid and also detect (or estimate) readhesion.

Now, with reference to FIG. 15, an example where a plurality of (four in this example) induction motors are coupled to the inverter will be described further with reference to the results of simulation of FIG. 16. By way of example, in the drawing of FIG. 15, 31-34 denote induction motors, 101-104 denote detectors for detecting rotor frequencies Fr1-Fr4 of induction motors 31-34, where the induction motors used have a rating of 130 kW.

Figure 15:
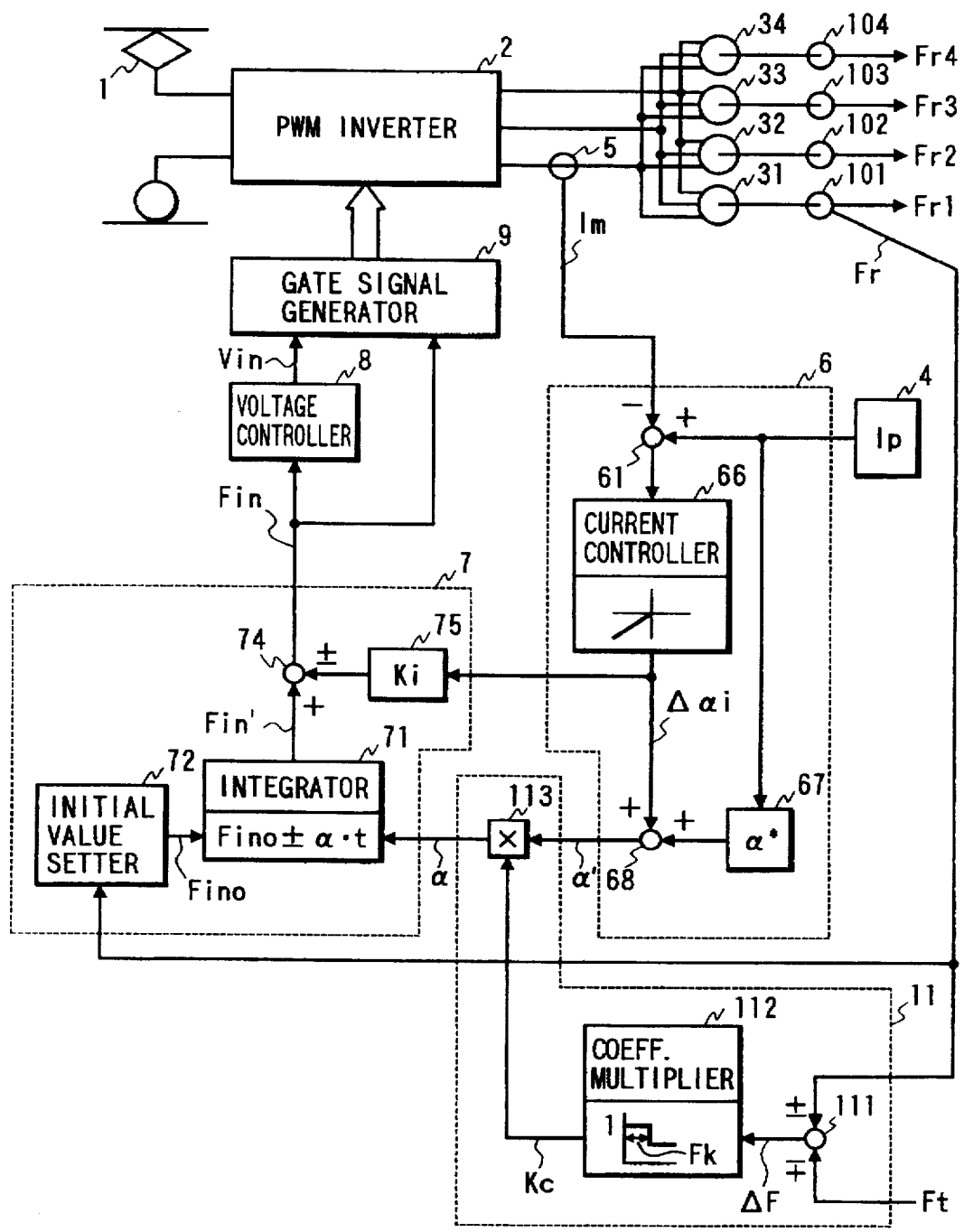
FIG. 15 is a schematic circuit diagram illustrative of a circuit used in simulation (corresponding to that of FIG. 10, further provided with four induction motors)
Figure 16:
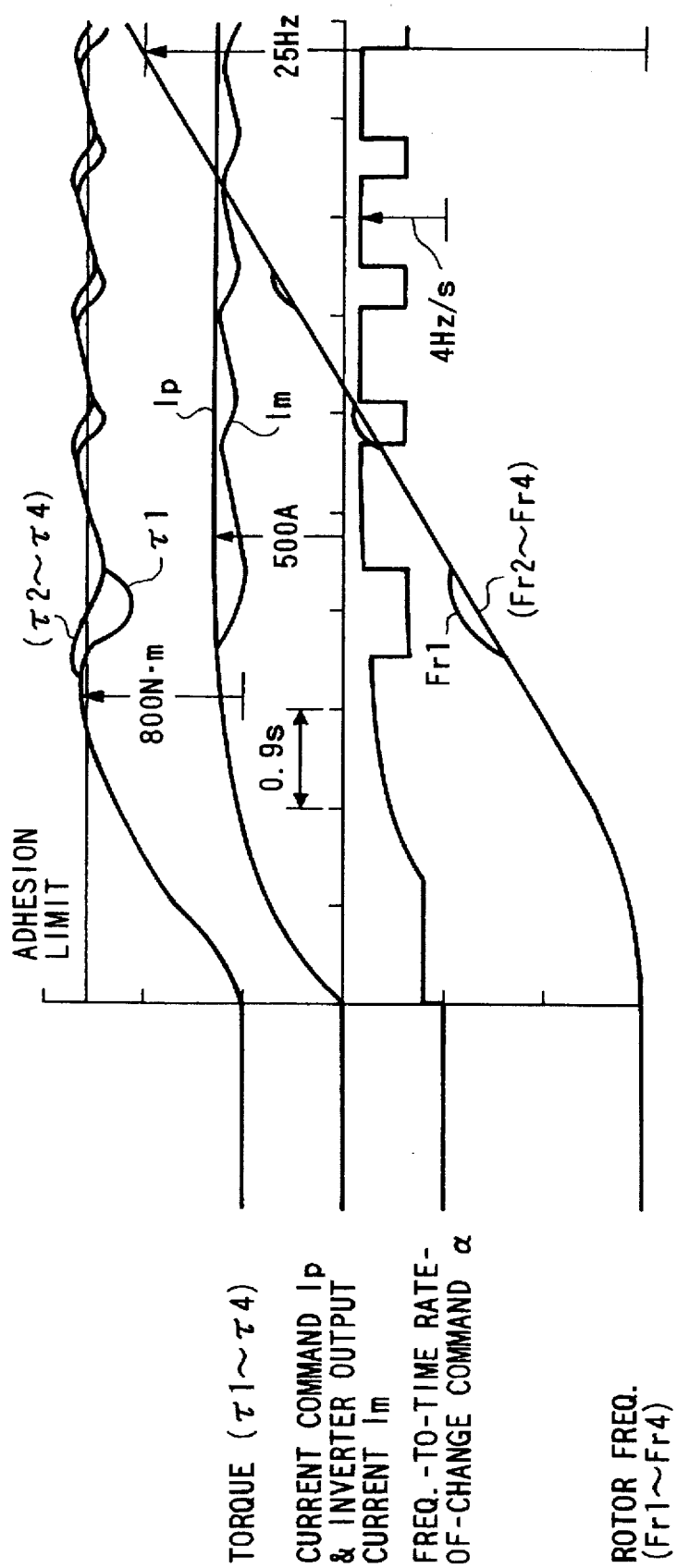
FIG. 16 is a diagram which shows results of simulation on readhesion control using the control circuit of FIG. 15.
Figure 17:
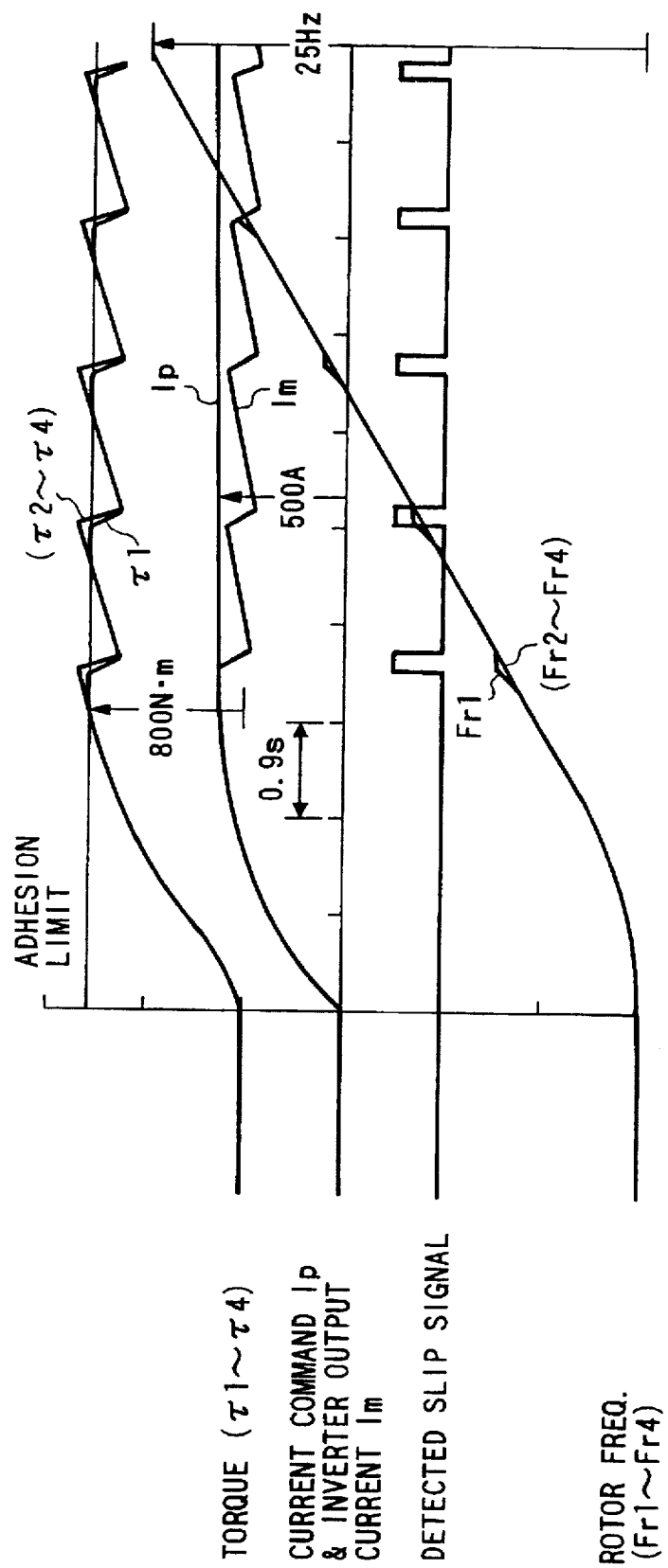
FIG. 17 is a diagram which shows results of simulation on readhesion control using the conventional method.

FIGS. 16 and 17 show examples of simulation obtained under conditions where an induction motor 31 alone among the induction motors 31-34 was subjected to a slip. The drawing of FIG. 16 indicates an example of readhesion control using the embodiment of FIG. 15, while the drawing of FIG. 17 indicates an example of the conventional readhesion control using the same slip detection method as the embodiment of FIG. 15 in which the slip frequency was controlled according to a predetermined pattern of a control curve, that is, upon detection of a slip, the speed was reduced at a fixed rate, and upon detection of readhesion, the speed was recovered gradually at a fixed rate. It is learned from FIG. 16 that according to the embodiment of FIG. 15, the values of torque $\tau1-\tau4$ of the induction motors 31-34 were controlled by current command Ip until the induction motor 31 reaches an adhesion limit. It is further learned from FIGS. 16 and 17 that, according to the embodiment of FIG. 15 (as indicated in FIG. 16), in comparison with the conventional method (as indicated in FIG. 17), the values of torque $\tau2-\tau4$ of the induction motors 32-34 in which no slip was present were ensured not to drop unnecessarily even when the induction motor 31 was caused to slip, meanwhile, the induction motor 31 was caused to recover adhesion, and thereby, the total torque $\tau1-\tau4$ of the induction motors 31-34 on average could be maintained higher in the vicinity of the adhesion limit.

Figure 18:
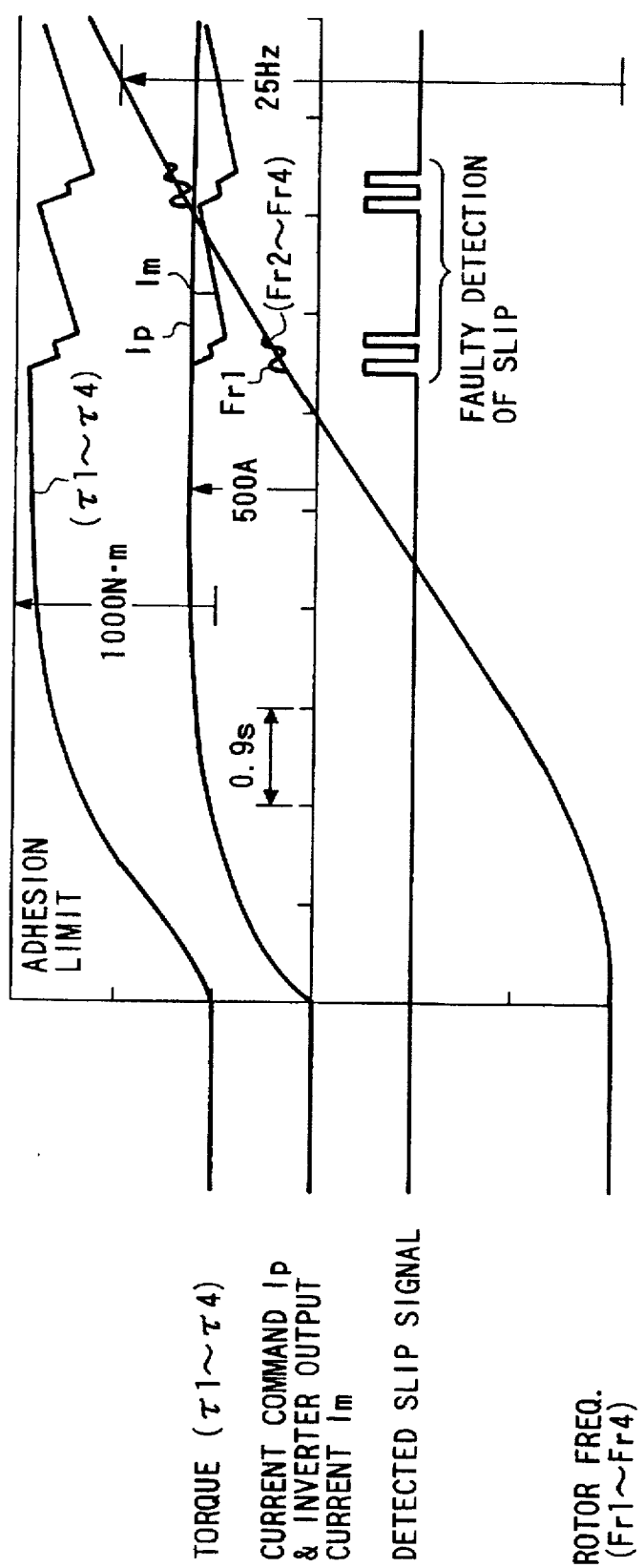
FIG. 18 is a diagram which shows results of simulation on faulty slip detection using the conventional method.

Examples of simulation are shown in FIGS. 18 and 19 in which rotor frequency Fr1 of the induction motor 31 alone among the motors 31-34 was oscillated to cause a faulty detection of a slip to occur. The drawing of FIG. 18 indicates an example of the conventional readhesion control using the same slip detection method as that of the embodiment of FIG. 15, in which the slip frequency is controlled in accordance with the fixed pattern, that is, upon detection of the slip, the speed is reduced at a constant rate, and upon detection of readhesion, the speed is gradually recovered at a constant rate. On the other hand, the drawing of FIG. 19 indicates an example of readhesion control according to the embodiment of FIG. 15.

It is clearly known in comparison of FIGS. 18 and 19 that upon a faulty detection of a slip, decrements of torque $\tau1-\tau4$ of the induction motors 31-34 according to the embodiment of FIG. 15 are restricted to very small amounts as depicted in FIG. 19, while according to the conventional method, decrements of torque $\tau1-\tau4$ of the induction motors 31-34 are very large as depicted in FIG. 18. Therefore, according to the conventional readhesion control method, it was necessary to set the detection level for detecting a slip at a larger level, and then, conversely, the slip of the induction motor 31 becomes greater as indicated in FIG. 17, thereby causing large drops in the torque of the induction motors 31-34, thereby degrading the acceleration characteristics.

In the foregoing embodiments of the invention as described heretofore, the current command has been described as a control input. This control input, however, may be a torque command or a torque current command in such a case as the vector control of an a.c. motor in which torque is controlled by a torque command or torque current command, and the same effect and advantage in the scope of the invention may be attained when the foregoing embodiments of the invention employ such a torque command or torque current command.

Further, in the foregoing embodiments of the invention, the electric vehicle is intended to include an electric car, rolling stock and electric locomotive, but it is not limited thereto, and should be construed to include an electric automobile as well.

According to the first aspect of the invention, there is an advantage in that, since the frequency command for the inverter does not basically depend on the rotor frequency of the induction motor, and in addition, since the output current of the inverter is controlled by the constant current control system, no overcurrent is likely to occur, and the vehicle can be accelerated or decelerated at a torque substantially corresponding to the current command. In addition, according to the second aspect of the invention, there is another advantage in that, even if a slip or skid occurs, since the frequency-to-time rate-of-change command will not exceed a predetermined value (the reference value which is larger than a frequency-to-time rate-of-change corresponding to the actual acceleration/deceleration of the vehicle), a violent slip or skid is not likely to occur, and thereby the self-readhesion of the induction motor can be expected to result depending on a particular rail condition (for example, in case the adhesion between the rail and wheels is caused to drop temporarily due to smeared oil or grease). In addition to the advantage of the foregoing second aspect, there is another advantage according to the third aspect of the invention in that, under such conditions that allow a slip/skid to take place, since the frequency-to-time rate-of-change command will be modified (adjusted) by the readhesion control system, and the self-readhesion property of the induction motors will be improved so that the vehicle can be accelerated or decelerated at an appropriate torque precisely corresponding to any rail conditions.

What is claimed is:

1. A control apparatus for controlling an electric vehicle comprising:

an induction motor for driving the electric vehicle;

an inverter for driving said induction motor;

means for generating an output current command for said inverter;

means for detecting an output current from said inverter;

means for generating a frequency-to-time rate-of-change command for an output frequency of said inverter based on a difference between said current command and a detected value of said output current; and means for generating an output frequency command for said inverter based on the frequency-to-time rate-of-change command.

2. The control apparatus for controlling an electric vehicle according to claim 1, wherein said means for generating the frequency-to-time rate-of-change command for said output frequency of said inverter operates to adjust a predetermined rate-of-change command based on a difference between said current command and a detected value of said output current.

3. The control apparatus for controlling an electric vehicle according to claim 1, further comprising means for adjusting said output frequency command in accordance with a difference between said current command and a detected value of said output current when the detected value exceeds said current command.

4. The control apparatus for controlling an electric vehicle according to claim 1, further comprising limiter means for limiting the frequency-to-time rate-of-change command for an output frequency of said inverter to a reference value which is larger than a frequency-to-time rate-of-change of an associated output frequency of said inverter corresponding to an acceleration or deceleration of the vehicle.

5. The control apparatus for controlling an electric vehicle according to claim 1, wherein said means for generating the frequency-to-time rate-of-change command for the output frequency of said inverter operates to adjust, based on a difference between said current command and a detected value of said output current, the reference value which is set larger than a frequency-to-time rate-of-change of an associated output frequency of said inverter corresponding to an acceleration or deceleration of the vehicle.

6. The control apparatus for controlling an electric vehicle according to claim 4 or 5, wherein said acceleration or deceleration of said vehicle is obtained from said current command.

7. The control apparatus for controlling an electric vehicle according to claim 4 or 5, wherein said acceleration or deceleration of said vehicle is obtained from a detected value of said output current.

8. The control apparatus for controlling an electric vehicle according to claim 4 or 5, further comprising a revolution detector mounted on an axis of a non-driving wheel, and means responsive to an output from said revolution detector for determining an acceleration or deceleration of said vehicle.

9. The control apparatus for controlling an electric vehicle according to claim 4 or 5, wherein said inverter is connected to drive a plurality of induction motors provided for driving said electric vehicle, and said acceleration or deceleration of said vehicle is determined by selecting a minimum value from respective rate-of-changes relative to time of revolutions of respective induction motors at a time of powering, and a maximum value from respective rate-of-changes relative to time of revolutions of respective induction motors at a time of regeneration.

10. The control apparatus for controlling an electric vehicle according to claim 1, further comprising means for detecting a slip and a skid of driving wheels driven by said induction motor, and means for decrementing the frequency-to-time rate-of-change command for the output frequency of said inverter during detection of said slip or skid.

11. The control apparatus for controlling an electric vehicle according to claim 10, wherein said means for detecting a slip and a skid of said driving wheels operates to compare an actual speed of said vehicle and a rotor frequency of said induction motor in order to detect an occurrence of the slip and skid.

12. The control apparatus for controlling an electric vehicle according to claim 11, wherein the actual speed of said vehicle is obtained from an output of a revolution detector mounted on the axis of a non-driving wheel of the vehicle.

13. The control apparatus for controlling an electric vehicle according to claim 11, wherein the actual speed of said vehicle is estimated both from a rotor frequency of said induction motor and an actual acceleration of said vehicle.

14. The control apparatus for controlling an electric vehicle according to claim 10, wherein said decrementing of the frequency-to-time rate-of-change command for the output frequency of said inverter is attained by said decrementing means decrementing a predetermined quantity when said slip or skid exceeds a predetermined value.

15. The control apparatus for controlling an electric vehicle according to claim 10, wherein said decrementing of the frequency-to-time rate-of-change command for the output frequency of said inverter is attained by said decrementing means in response to a quantity of said slip or skid.

16. The control apparatus for controlling an electric vehicle according to claim 1, further comprising means for detecting a rotor frequency of said induction motor, and means for setting an initial value for said inverter output frequency command in dependency on a rotor frequency detected at the time of starting of said inverter.

17. A control apparatus for controlling an electric vehicle comprising:

an induction motor for driving the electric vehicle;

an inverter for driving said induction motor;

means for generating an output current command for said inverter;

means for detecting an output current of said inverter;

means for generating a frequency-to-time rate-of-change command for an output frequency of said inverter based on a difference between said current command and a detected value of said output current, the frequency-to-time rate-of-change command being limited so as not to exceed a predetermined value; and means for generating an output frequency command for said inverter based on an output from said means for generating the frequency-to-time rate-of-change command.

18. The control apparatus for controlling an electric vehicle according to claim 17, wherein said frequency-to-time rate-of-change command generation means operates to generate a frequency-to-time rate-of-change command for the output frequency of said inverter in dependency on a difference between said current command and the detected value of said output current, and includes a limiter for limiting the frequency-to-time rate-of-change command for the output frequency of the inverter from exceeding a predetermined value.

19. The control apparatus for controlling an electric vehicle according to claim 18, further comprising means for adjusting said inverter output frequency command, when a detected value of said current command exceeds said current command, in accordance with a difference therebetween.

20. The control apparatus for controlling an electric vehicle according to claim 17, wherein said frequency-to-time rate-of-change command generation means includes:

current control means which, when a difference between said current command and said detected value of said output current becomes negative, produces an output in dependency on said difference, and means for adjusting said predetermined value in response to said output from said current control means.

21. The control apparatus for controlling an electric vehicle according to claim 20, further comprising means for adjusting said inverter output frequency command, when a difference between said current command and said detected value of said output current becomes negative, in accordance with said difference.

22. The control apparatus for controlling an electric vehicle according to claim 18 or 20, wherein said predetermined value is set at a value larger than an associated frequency-to-time rate-of-change of the output frequency of said inverter corresponding to an acceleration or deceleration of the vehicle.

23. A control apparatus for controlling an electric vehicle comprising:

an induction motor for driving the electric vehicle;

an inverter for driving said induction motor;

means for generating a current command for said inverter to output an output current in response thereto;

means for detecting said output current of said inverter;

means for generating a reference frequency-to-time rate-of-change command which is larger than an associated frequency-to-time rate-of-change of the output frequency of said inverter corresponding to an acceleration or deceleration of the vehicle;

means, having an adjustable area for adjusting said reference frequency-to-time rate-of-change command in accordance with a difference between said current command and a detected value of said output current, for generating a frequency-to-time rate-of-change command which is smaller than said reference frequency-to-time rate-of-change command; and means for generating an output frequency command for said inverter in dependency on said frequency-to-time rate-of-change command.

24. The control apparatus for controlling an electric vehicle according to claim 23, wherein said adjustable area for adjusting said reference frequency-to-time rate-of-change command is a domain in which the detected value of said output current becomes larger than said current command.

25. A control apparatus for controlling an electric vehicle comprising:

an induction motor for driving said electric vehicle;

an inverter for driving said induction motor;

means for generating an output current command for said inverter to output an output current in response thereto;

means for detecting an output current of said inverter;

means for generating a frequency-to-time rate-of-change command for the output frequency of said inverter based on a difference between said current command and a detected value of said output current, said command being limited so as not to exceed a predetermined value;

detection means for detecting a slip and skid of a driving wheel driven by said induction motor;

readhesion control means for reducing said frequency-to-time rate-of-change command in response to an output from said detection means; and means for generating an output frequency command for the output frequency of said inverter in response to the frequency-to-time rate-of-change command thus reduced.

26. The control apparatus for controlling an electric vehicle according to claim 25, further comprising means for adjusting said output frequency command which, when said detected value of said output current exceeds said current command, is adjusted in accordance with a difference therebetween.

27. The control apparatus for controlling the electric vehicle according to claim 25, wherein said readhesion control means, upon detection of a slip or skid of the motor, adjusts said frequency-to-time rate-of-change command by reducing the same to a smaller value than a value corresponding to an acceleration or deceleration of the vehicle.

28. The control apparatus for controlling the electric vehicle according to claim 25, wherein said readhesion control means is adapted, upon detection of a slip or skid of the motor, to adjust said frequency-to-time rate-of-change command in accordance with a quantity of the slip or skid detected.

29. A control apparatus for controlling an electric vehicle comprising:

an induction motor for driving said electric vehicle;

an inverter for driving said motor;

means for generating an output current command for said inverter to output an output current in response thereto;

means for detecting an output current of said inverter;

means for generating a reference frequency-to-time rate-of-change command which is larger than an associated frequency-to-time rate-of-change of the output frequency of said inverter corresponding to an acceleration or deceleration of the vehicle;

means, having an adjustable area to adjust said reference frequency-to-time rate-of-change command based on a difference between said current command and a detected value of said output current, for generating a frequency-to-time rate-of-change command which is smaller than said reference frequency-to-time rate-of-change command;

means for detecting a slip and skid of a driving wheel driven by said induction motor;

readhesion control means for reducing said frequency-to-time rate-of-change command in dependency on an output of said detection means; and means for generating an output frequency command for said inverter in response to the frequency-to-time rate-of-change command thus reduced.

30. The control apparatus for controlling an electric vehicle according to claim 29, further comprising means for adjusting said output frequency command, when said detected value of said output current exceeds said current command, in accordance with a difference therebetween.

31. The control apparatus for controlling the electric vehicle according to claim 29, wherein, upon detection of a slip or skid of the motor, said readhesion control means adjusts said frequency-to-time rate-of-change command to become smaller than an associated value corresponding to the acceleration or deceleration of the vehicle.

32. The control apparatus for controlling the electric vehicle according to claim 29, wherein, upon detection of a slip or skid of the motor, said readhesion control means adjusts said frequency-to-time rate-of-change command in accordance with a quantity of said slip or skid.

* * * * *